US012748560B2

(12) United States Patent
Fukuda

(10) Patent No.: US 12,748,560 B2
(45) Date of Patent: Sep. 29, 2026

(54) IMAGE FORMING APPARATUS THAT UPDATES A TRANSACTION HISTORY OF ELECTRONIC DATA BASED ON PRINTING, INFORMATION TERMINAL, METHODS OF CONTROLLING IMAGE FORMING APPARATUS AND INFORMATION TERMINAL, STORAGE MEDIUM, AND IMAGE FORMING

(71) Applicant: Canon Kabushiki Kaisha, Tokyo (JP)

(72) Inventor: Masato Fukuda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 143 days.

(21) Appl. No.: 18/413,199

(22) Filed: Jan. 16, 2024

(65) Prior Publication Data

US 2024/0265121 A1 Aug. 8, 2024

(30) Foreign Application Priority Data

Feb. 3, 2023 (JP) ................................ 2023-015635

(51) Int. Cl.
*G06F 3/12* (2006.01)
*G06F 21/10* (2013.01)

(52) U.S. Cl.
CPC .......... *G06F 3/1238* (2013.01); *G06F 3/1205* (2013.01); *G06F 3/1222* (2013.01); *G06F 3/1273* (2013.01); *G06F 21/108* (2023.08); *G06F 3/1285* (2013.01)

(58) Field of Classification Search
CPC .... G06F 3/1238; G06F 3/1205; G06F 3/1222; G06F 3/1273; G06F 3/1285; G06F 21/108; G06F 21/608; H04L 9/3213; H04L 9/50
See application file for complete search history.

(56) References Cited

U.S. PATENT DOCUMENTS

| | | | | | |
|---|---|---|---|---|---|
| 10,771,639 | B1 * | 9/2020 | Kosaka | G06F 3/1209 |
| 11,057,529 | B1 * | 7/2021 | Kosaka | H04N 1/4486 |
| 11,822,838 | B1 * | 11/2023 | Ferrara, Jr. | G06F 3/1222 |
| 2015/0178026 | A1 * | 6/2015 | Sato | G06F 3/1238 358/1.14 |
| 2020/0341702 | A1 * | 10/2020 | Kosaka | G06F 21/608 |
| 2020/0349541 | A1 * | 11/2020 | Gaddis | G06Q 30/0601 |
| 2021/0303236 | A1 * | 9/2021 | Park | H04L 9/0643 |
| 2022/0011743 | A1 * | 1/2022 | Shetty | G06N 3/08 |
| 2022/0131705 | A1 * | 4/2022 | Venkatesh | G06F 3/1231 |
| 2023/0069223 | A1 * | 3/2023 | Patel | G06Q 20/065 |

(Continued)

FOREIGN PATENT DOCUMENTS

JP 2021149906 A 9/2021

*Primary Examiner* — Nicholas Pachol
(74) *Attorney, Agent, or Firm* — Venable LLP

(57) ABSTRACT

The present image forming apparatus: obtains a job ticket related to printing from an information terminal, regarding electronic data for which an ownership is managed in a transaction of a blockchain network; obtains the electronic data from a management server that manages the electronic data, using information that is included in the obtained job ticket and is related to a transaction for transferring or lending the ownership of the electronic data from the information terminal to the image forming apparatus; generate a transaction that contains history information related to the executed printing, using the obtained electronic data and information related to print settings of the job ticket, execute printing; and using the information related to the transaction.

8 Claims, 15 Drawing Sheets

(56) References Cited

U.S. PATENT DOCUMENTS

| | | | | |
|---|---|---|---|---|
| 2023/0266930 | A1* | 8/2023 | Baker | H04L 63/12<br>358/1.14 |
| 2023/0267183 | A1* | 8/2023 | Atwood | G06F 3/1222<br>726/26 |
| 2023/0350616 | A1* | 11/2023 | Hasegawa | G06F 3/1238 |
| 2024/0231720 | A1* | 7/2024 | Okutsu | G06F 3/1292 |

* cited by examiner

FIG. 13

1300

```
{
    "tokenID": 1,
    "filepath":"\\aaa\bbb.pdf",
    "displayname":"GRADE 7 PROFICIENCY TEST",
    "icon":"0xba90235baca00981..."
}
```

1310

```
{
    "tokenID": 2,
    "filepath":"\\ccc\ddd.pdf",
    "displayname":"GRADE 8 PROFICIENCY TEST",
    "icon":"0xba90235baca00981..."
}
```

FIG. 14

```
[
    {
        "tokenID": 1,
        "transactionID":"0x197db78226479c1a",
        "displayname":"GRADE 7 PROFICIENCY TEST",
        "icon":"0xba90235baca00981..."
    },
    {
        "tokenID": 2,
        "transactionID":"0x7340611234faa5ae",
        "displayname":"GRADE 8 PROFICIENCY TEST",
        "icon":"0xba90235baca00981..."
    }
]
```

FIG. 15

```
{
    "dataCryptoKey": "0xa65498caba100add",
    "walletAddress":"0x545e39ibda572e52",
    "ownerConfirmKey":"0x4ad654baac9e0cc3",
    "jobURI":"https://192.168.1.11/bclockChainPrint",
    "colorEnable":"TRUE",
    "duplexEnable":"TRUE",
}
```

FIG. 16A

| | |
|---|---|
| TRANSACTION ID | 0x197db78226479c1a |
| PREVIOUS TRANSACTION DIGEST | 0x017eacad78913157 |
| SENDER | 0x81760123dbc75954 |
| RECEIVER | 0xad172adf867bba6c |
| TOKEN ID | 1 |
| TIME STAMP | 2019/1/1 20:00:00 |
| DIGITAL CERTIFICATE DIGEST | 0x7895aca304d456b8 |
| OWNER VERIFICATION PUBLIC KEY | 0x15879cd0d99e16f3 |
| DATA ENCRYPTION PUBLIC KEY | 0xa98321dbd7d7a92d |
| ROLE | Assignment |
| EXPIRATION DATE | None |
| NUMBER OF PRINTED COPIES | 0 |

1601

| | |
|---|---|
| TRANSACTION ID | 0xa456adf87421cab3 |
| PREVIOUS TRANSACTION DIGEST | 0x7895aca304d456b8 |
| SENDER | 0xad172adf867bba6c |
| RECEIVER | 0x545e39ibda572e52 |
| TOKEN ID | 1 |
| TIME STAMP | 2020/1/1 12:00:00 |
| DIGITAL CERTIFICATE DIGEST | 0xada987ad097ea |
| OWNER VERIFICATION PUBLIC KEY | 0x4ad654baac9e0cc3 |
| DATA ENCRYPTION PUBLIC KEY | 0xa65498caba100add |
| ROLE | Rent |
| EXPIRATION DATE | 2020/1/1 12:30:00 |
| NUMBER OF PRINTED COPIES | 0 |

1602

1603

| | |
|---|---|
| TRANSACTION ID | 0x197db78226479c1a |
| PREVIOUS TRANSACTION DIGEST | 0xcc098afa0bada098 |
| SENDER | 0x545e39ibda572e52 |
| RECEIVER | 0xad172adf867bba6c |
| TOKEN ID | 1 |
| TIME STAMP | 2020/1/1 12:01:00 |
| DIGITAL CERTIFICATE DIGEST | 0x7ba8991ceef15329 |
| OWNER VERIFICATION PUBLIC KEY | 0x15879cd0d99e16f3 |
| DATA ENCRYPTION PUBLIC KEY | 0xa98321dbd7d7a92d |
| ROLE | Return |
| EXPIRATION DATE | None |
| NUMBER OF PRINTED COPIES | 1 |

FIG. 16B

1604

| | |
|---|---|
| TRANSACTION ID | 0x7340611234faa5ae |
| PREVIOUS TRANSACTION DIGEST | 0x098adf098abadae |
| SENDER | 0x130897aca098baeff |
| RECEIVER | 0xad172adf867bba6c |
| TOKEN ID | 2 |
| TIME STAMP | 2019/1/1 20:00:00 |
| DIGITAL CERTIFICATE DIGEST | 0xa80ae0723adebc33 |
| OWNER VERIFICATION PUBLIC KEY | 0x15879cd0d99e16f3 |
| DATA ENCRYPTION PUBLIC KEY | 0xa98321dbd7d7a92d |
| ROLE | Assignment |
| EXPIRATION DATE | None |
| NUMBER OF PRINTED COPIES | 0 |

FIG. 17

```
{
    "colorMode":"color",
    "duplex":"simplex",
    "copies":"1"
    "loginURL":"http://aaa.com/login",
    "imageURL":"http://aaa.com/images",
    "walletAddress":"0xad172adf867bba6c",
    "transactionID":"0xa456adf87421cab3"
    "cryptoKey":"0x15879cd0d99e16f3"
}
```

IMAGE FORMING APPARATUS THAT UPDATES A TRANSACTION HISTORY OF ELECTRONIC DATA BASED ON PRINTING, INFORMATION TERMINAL, METHODS OF CONTROLLING IMAGE FORMING APPARATUS AND INFORMATION TERMINAL, STORAGE MEDIUM, AND IMAGE FORMING

BACKGROUND OF THE INVENTION

Field of the Invention

The present invention relates to an image forming apparatus, an information terminal, methods of controlling the image forming apparatus and the information terminal, a storage medium, and an image forming system.

Description of the Related Art

Electronic data usage permissions are managed using a blockchain. Japanese Patent Laid-Open No. 2021-149906 proposes a technique for requesting that a blockchain change an electronic data usage permission in response to a transaction request from a communication terminal to a service and providing the communication terminal, which now has a usage permission, with a transaction object and data associated with the transaction object.

However, the above prior art has the following challenges. For example, the above-described prior art cannot manage that electronic data for which the user has a usage permission has been printed in an image forming apparatus. When a print history cannot be managed, it is necessary that payment be made before printing or that a contract that permits printing up to a predetermined number of sheets be entered into in advance. However, depending on the service format, the required number of copies to be printed may change dynamically according to the situation. In such a case, in the prior art, there is room for improvement in usability, for example, in the need for additional payment and renewal of contract depending on the change in the necessary number of copies to be printed.

SUMMARY OF THE INVENTION

The present invention enables realization of a mechanism for suitably managing a print history for electronic data for which usage permissions are managed on a blockchain.

One aspect of the present invention provides an image forming apparatus comprising: at least one memory device that stores a set of instructions; and at least one processor that executes the set of instructions to: obtain a job ticket related to printing from an information terminal, regarding electronic data for which an ownership is managed in a transaction of a blockchain network; obtain the electronic data from a management server that manages the electronic data, using information that is included in the obtained job ticket and is related to a transaction for transferring or lending the ownership of the electronic data from the information terminal to the image forming apparatus; execute printing using the obtained electronic data and information related to print settings of the job ticket; and generate, using the information related to the transaction, a transaction that contains history information related to the executed printing.

Another aspect of the present invention provides an information terminal comprising: at least one memory device that stores a set of instructions; and at least one processor that executes the set of instructions to: issue a transaction for transferring or lending the ownership to an image forming apparatus, regarding electronic data for which an ownership is managed in a transaction of a blockchain network; obtain a transaction ID obtained from the blockchain network, regarding the issued transaction; and generate a job ticket related to printing of the electronic data and transmit the job ticket to the image forming apparatus, using authentication information obtained from the image forming apparatus and the transaction ID.

Still another aspect of the present invention provides a method of controlling an image forming apparatus, the method comprising: obtaining a job ticket related to printing from an information terminal, regarding electronic data for which an ownership is managed in a transaction of a blockchain network; obtaining the electronic data from a management server that manages the electronic data, using information that is included in the obtained job ticket and is related to a transaction for transferring or lending the ownership of the electronic data from the information terminal to the image forming apparatus; executing printing, using the obtained electronic data and information related to print settings of the job ticket; and generating a transaction that contains history information related to the executed printing, using the information related to the transaction.

Yet still another aspect of the present invention provides a method of controlling an information terminal, the method comprising: issuing a transaction for transferring or lending the ownership to an image forming apparatus, regarding electronic data for which an ownership is managed in a transaction of a blockchain network; obtaining a transaction ID obtained from the blockchain network, regarding the issued transaction; and generate a job ticket related to printing of the electronic data and transmit the job ticket to the image forming apparatus, using authentication information obtained from the image forming apparatus and the transaction ID.

Still yet another aspect of the present invention provides a non-transitory computer-readable storage medium storing a program for causing a computer to execute each step in a method of controlling an image forming apparatus, the method comprising: obtaining a job ticket related to printing from an information terminal, regarding electronic data for which an ownership is managed in a transaction of a blockchain network; obtaining the electronic data from a management server that manages the electronic data, using information that is included in the obtained job ticket and is related to a transaction for transferring or lending the ownership of the electronic data from the information terminal to the image forming apparatus; executing printing, using the obtained electronic data and information related to print settings of the job ticket; and generating a transaction that contains history information related to the executed printing, using the information related to the transaction.

Yet still another aspect of the present invention provides a non-transitory computer-readable storage medium storing a program for causing a computer to execute each step in a method of controlling an information terminal, the method comprising: issuing a transaction for transferring or lending the ownership to an image forming apparatus, regarding electronic data for which an ownership is managed in a transaction of a blockchain network; obtaining a transaction ID obtained from the blockchain network, regarding the issued transaction; and generating a job ticket related to printing of the electronic data and transmit the job ticket to the image forming apparatus, using authentication information obtained from the image forming apparatus and the transaction ID.

Still yet another aspect of the present invention provides an image forming system that includes an information terminal, an image forming apparatus, and a management server, the information terminal comprising: at least one first memory device that stores a set of instructions; and at least one first processor that executes the set of instructions to: issue a transaction for transferring or lending the ownership to an image forming apparatus, regarding electronic data for which an ownership is managed in a transaction of a blockchain network; and generate a job ticket related to printing of the electronic data and transmit the job ticket to the image forming apparatus based on authentication information obtained from the image forming apparatus, the image forming apparatus comprising: at least one second memory device that stores a set of instructions; and at least one second processor that executes the set of instructions to: obtain the job ticket related to printing the electronic data from the information terminal; obtain the electronic data from a management server that manages the electronic data, using information that is included in the obtained job ticket and is related to a transaction for transferring or lending the ownership of the electronic data from the information terminal to the image forming apparatus; execute printing, using the obtained electronic data and information related to print settings of the job ticket; and generate a transaction that contains history information related to the executed printing, using the information related to the transaction.

Further features of the present invention will become apparent from the following description of exemplary embodiments (with reference to the attached drawings).

BRIEF DESCRIPTION OF THE DRAWINGS

FIG. 13 is a diagram illustrating examples of data of tokens according to one embodiment.

FIG. 14 is a diagram illustrating an example of data of a file information list according to one embodiment.

FIG. 15 is a diagram illustrating an example of data of print destination information according to one embodiment.

FIGS. 16A-16B are a diagram illustrating examples of data of transactions according to one embodiment.

FIG. 17 is a diagram illustrating examples of data of a job ticket according to one embodiment.

DESCRIPTION OF THE EMBODIMENTS

Figure 1:
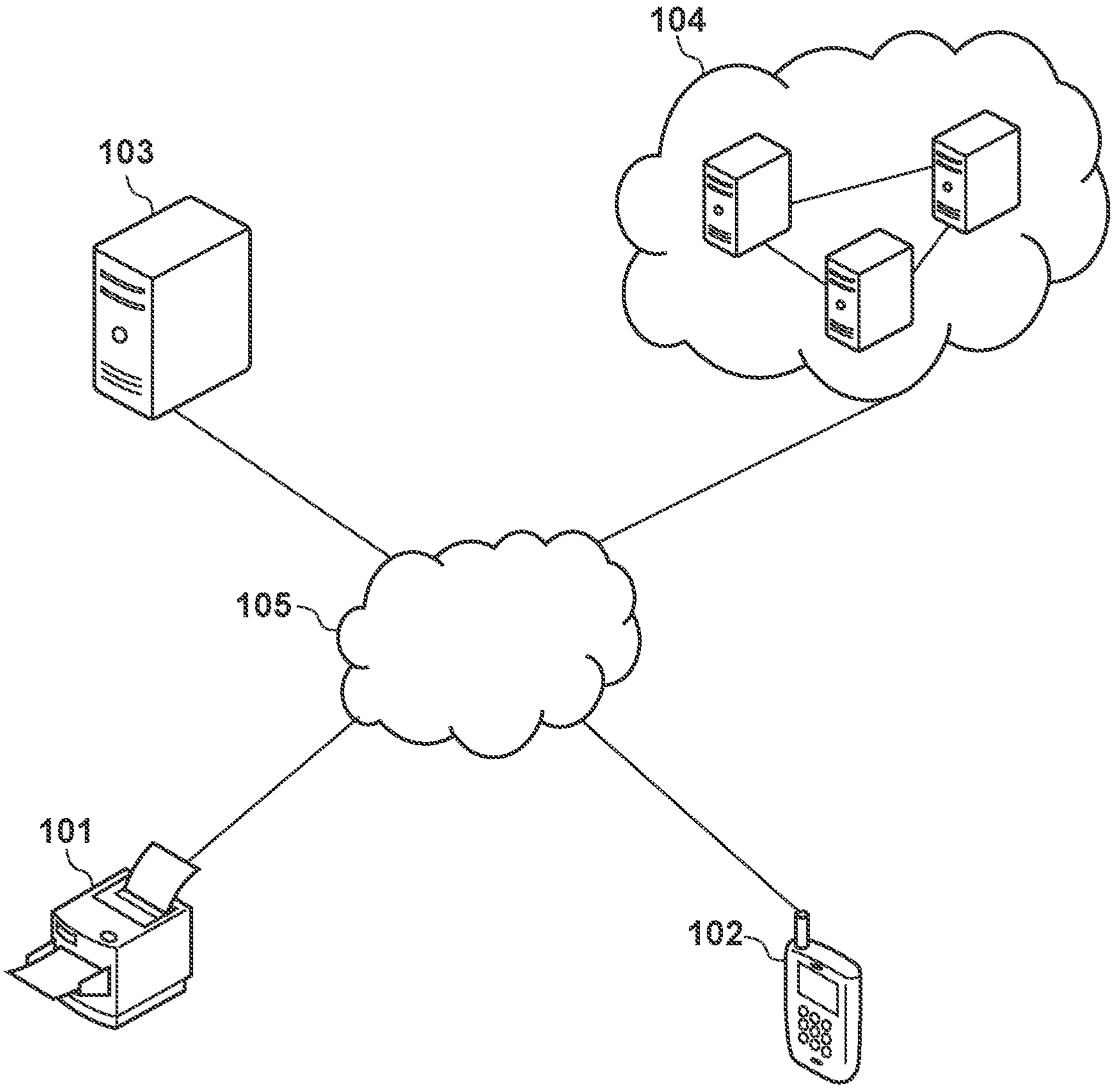
FIG. 1 is a diagram illustrating an example of a configuration of a system according to one embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

<Configuration of Printing System>

One embodiment of the present invention will be described below. An image forming apparatus according to the present embodiment is an example of an information processing apparatus. The public and private keys to be described in the present embodiment are public key cryptography keys, and electronic data encryption and decryption, digital signature, verification, and the like can be performed using key generation algorithms, encryption algorithms, and decryption algorithms.

First, a system configuration according to the present embodiment will be described with reference to FIG. 1. As illustrated in FIG. 1, a printing system according to the present embodiment is configured to include, for example, an image forming apparatus 101, an information terminal 102, a management server 103, and a blockchain network 104. The image forming apparatus 101, the information terminal 102, the management server 103, and the blockchain network 104 can communicate with each other via the Internet 105. In the present embodiment, an example in which one image forming apparatus 101 and one information terminal 102 are connected will be described but is not intended to limit the present invention, and a configuration in which a plurality of respective apparatuses are connected may be taken.

The image forming apparatus 101 is a multifunctional peripheral that includes a plurality of functions, such as copying, scanning, printing, and faxing. The image forming apparatus 101 may be an apparatus that includes one function, such as a printer or a scanner. The information terminal 102 is a portable information device that the user owns, such as a smartphone, a tablet, a portable telephone, and an information terminal, for example. The information terminal 102 includes functions of generating a print job for printing, in the image forming apparatus 101, an image file stored in the management server 103 and of transmitting transaction data to the blockchain network 104 via the Internet 105.

The management server 103 is configured to include one or more cloud servers and provides services for managing electronic data, which includes image data, and manages user information for accessing the electronic data. The management server 103 receives an image obtainment request from the image forming apparatus 101 or the information terminal 102. Then, the management server 103 determines whether the requesting image forming apparatus 101 or information terminal 102 holds the ownership of electronic data based on transactions that are stored in the blockchain network 104 via the Internet 105. Further, the management server 103 transmits encrypted electronic data to the image forming apparatus 101 or the information terminal 102, which holds the ownership.

In addition, electronic data and information related to the electronic data are associated in a data structure referred to as a token. FIG. 13 illustrates examples of tokens according to the present embodiment. As illustrated in FIG. 13, tokens 1300 and 1310 have a data structure of a token ID, a file path, a display name, and an icon. "tokenID" indicates a token ID that is uniquely determined for each token. "filePath" indicates a file path in a storage 405 of the management server 103, which is an image data storage location and will be described later. "displayName" indicates a display name at the time of display in a print application of the information terminal 102. "icon" is JSON format data that holds an icon image to be displayed in the print application as binary data.

In the examples illustrated in FIG. 13, a use case in which a cram school prints question sheets and answer sheets for each grade is assumed, for example. A case where electronic data of teaching materials, such as question sheets and answer sheets, are managed in the blockchain and the cram school is on a subscription for those teaching materials is assumed. In this use case, the user, who corresponds to the cram school, has the ownership of the electronic data, and the ownership for using the electronic data is transferred or lent from the information terminal 102 to the image forming apparatus 101. The image forming apparatus 101 obtains electronic data from the management server 103 using the transferred or rented ownership and executes printing. The image forming apparatus 101 generates a transaction that includes a history, such as that of printing, and issues the transaction to the blockchain. Conventionally, it is necessary that payment is made before printing or a contract that allows printing up to a predetermined number of copies is entered. Meanwhile, according to the present embodiment, with the above-described mechanism, printing results can be stored and payments can be made later according to the increase or decrease in the number of students, and so, a more flexible service can be provided. A use case in which teaching materials are used as an example of electronic data whose ownership is controlled by using the blockchain has been described. However, it is not intended to limit the present invention, and electronic data, such as electronic books, medical documents (e.g., medical records and prescriptions), official documents (e.g., residence records), newspapers, posters, and calendars, may be a target.

The blockchain network 104 is a network that is configured by a plurality of nodes. Each node holds a blockchain in which pieces of data called blocks, each containing a plurality of transactions and a header, are linked together in a time series. The information processing apparatuses that are on the network, such as the image forming apparatus 101 and the information terminal 102, transmit transaction data created in a JavaScript Object Notation (JSON) format to a blockchain URL, "http://BC1.io". With this, a transaction generation request can be made to the blockchain network 104. Upon receiving the transaction generation request, the blockchain network 104 broadcasts the transaction data to each node on the blockchain. Subsequently, the nodes of the blockchain network verify the validity of the transaction data by a consensus algorithm, such as proof of work (PoW) and proof of stake (PoS). If the transmitted transaction data is valid transaction data, the transactions are stored in the blockchains held by the respective nodes based on the transmitted transaction data.

A transaction includes a transaction ID that is uniquely determined for each transaction and a previous transaction digest for which the previous transaction, which indicates an immediately prior transaction, has been encrypted by using a private key of the transferor. The transaction also includes a sender, which is a wallet address generated from a wallet held by the ownership transferor, and a receiver, which is a wallet address generated from a wallet held by the ownership transferee. The transaction also includes a token ID which is an ID for identifying the token, a time stamp indicating the time at which the transaction was generated, and a digital certificate digest for proving that the transaction was generated by the sender. The transaction also includes an owner verification public key for verifying the sender of the transaction and a data encryption public key for encrypting image data. In addition, the transaction includes a transaction role and, when the role is "Rent", an expiration date, which is a timestamp indicating until what time the electronic data is available to the receiver, and the number of printed copies indicating the number of copies that have been printed by the image forming apparatus.

Here, it is assumed that the storage 405 of the management server 103 stores the image data of a "seventh grade proficiency test" and an "eighth grade proficiency test" as well as the token 1300 whose token ID is "1" and the token 1310 whose token ID is "2". Further, it is assumed that the state is such that, in the blockchain network 104, a transaction 1601 of FIG. 16A indicating that the user's wallet, "0xad172adf867bba6c", has the ownership of the "seventh grade proficiency test" has been written. In addition, it is assumed that the state is such that a transaction 1604 of FIG. 16B indicating that the user's wallet, "0xad172adf867bba6c", has the ownership of the "eighth grade proficiency test" has also been written.

<Hardware Configuration of Image Forming Apparatus>

Figure 2:
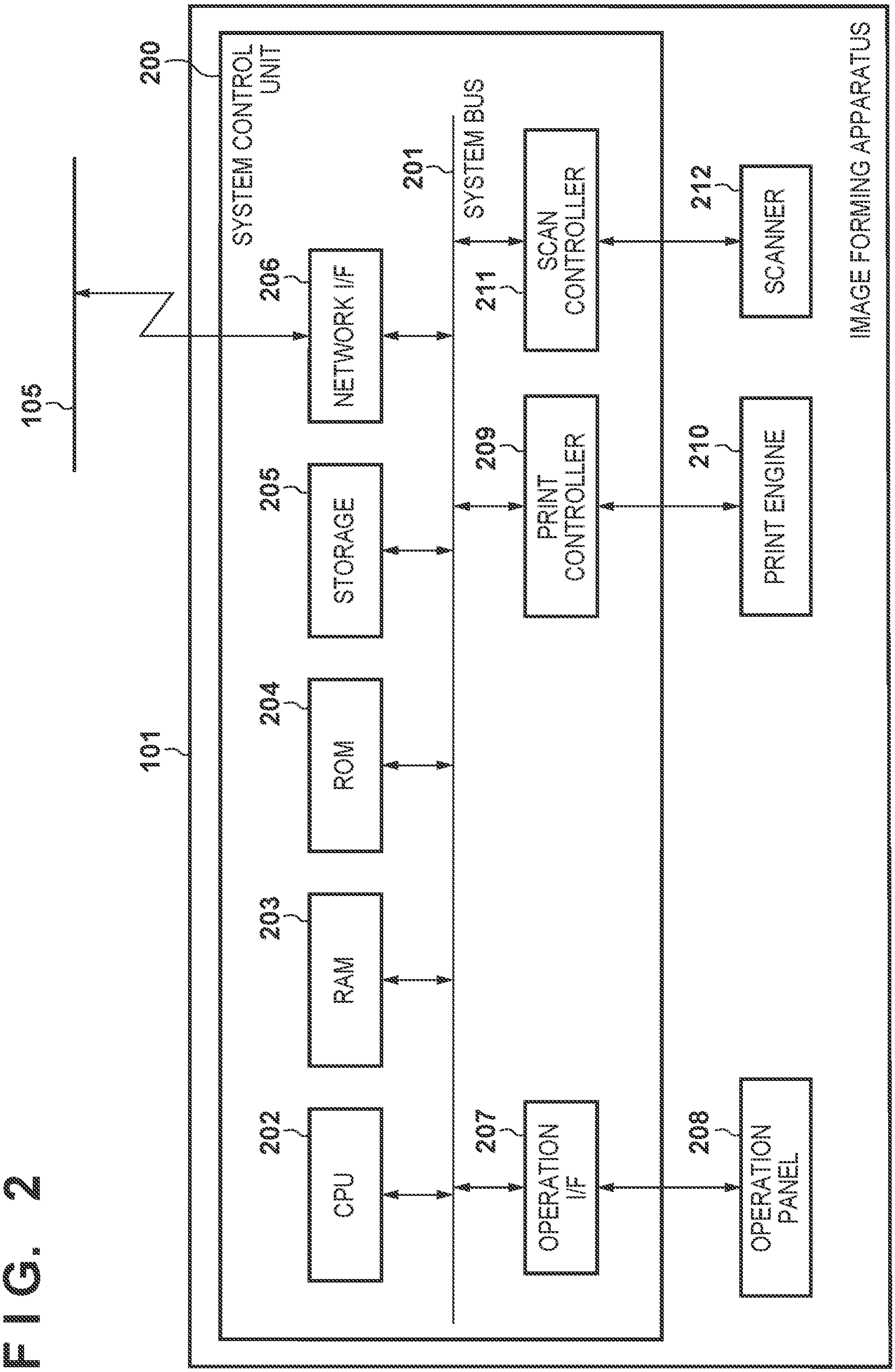
FIG. 2 is a diagram illustrating an example of a hardware configuration of an image forming apparatus according to one embodiment.

Next, an example of a hardware configuration of the image forming apparatus 101 according to the present embodiment will be described with reference to FIG. 2. The image forming apparatus 101 includes a system control unit 200, an operation panel 208, a print engine 210, and a scanner 212. The system control unit 200 includes a CPU 202, a RAM 203, a ROM 204, a storage 205, a network I/F 206, an operation I/F 207, a print controller 209, and a scan controller 211, which are connected to a system bus 201.

The central processing unit (CPU) 202 controls the operation of the entire image forming apparatus 101. The CPU 202 reads control programs stored in the ROM 204 or the storage 205 and performs various kinds of control, such as read control and print control. The RAM 203 is a main storage memory of the CPU 202 and is used as a work area as well as a temporary storage area for loading the various kinds of control programs stored in the ROM 204 and the storage 205. The ROM 204 stores control programs that can be executed by the CPU 202. In the present embodiment, control firmware for controlling the image forming apparatus 101 and a QR code encoder for generating a code image (e.g., a two-dimensional code, such as a QR Code®) are stored.

The storage 205 stores print data, image data, various kinds of programs, and various kinds of setting information. In the image forming apparatus 101 of the present embodiment, the storage 205 stores a hierarchy deterministic (HD) wallet, which is a mechanism for hierarchically creating private keys, and an HD wallet program for managing the HD wallet. Here, various kinds of setting information that are in the image forming apparatus, such as administrator information and user information, may be associated with the HD wallet, or a plurality of HD wallets may be stored in the image forming apparatus 101. A method of registering a wallet will be described later with reference to FIG. 18. In addition, the storage 205 stores the blockchain URL, "http://BC1.io", with which the blockchain print application communicates. Further, the storage 205 stores an authentication token obtainment request uniform resource identifier (URI), "http://aaa.com/login", which is a request URI of the management server 103. The storage 205 stores a file list obtainment request URI, "http://aaa.com/fileList", and an image obtainment request URI "http://aaa.com/images".

In the image forming apparatus 101 according to the present embodiment, it is assumed that the respective processes illustrated in the flowcharts to be described later are executed by one CPU 202 using one memory (the RAM 203) but may be executed in another manner. For example, the respective processes illustrated in the flowcharts to be described later may be executed by a plurality of CPUs, RAMs, ROMs, and storages in cooperation. Further, some processes may be executed using a hardware circuit, such as an application specific integrated circuit (ASIC) or a field-programmable gate array (FPGA).

The network I/F 206 is an interface for the image forming apparatus 101 to communicate with an external apparatus via the Internet 105. The CPU 202 transmits electronic data that has been read by the scanner 212 to the management server 103 or some server on the Internet 105 via the network I/F 206. The CPU 202 also receives electronic data managed by the management server 103 or some server on the Internet 105 via the network I/F 206 and prints the electronic data in the print engine 210. The CPU 202 transmits transaction data related to the image forming apparatus to the blockchain network 104 via the network I/F 206.

The operation panel 208 displays a screen that is controlled by the operation I/F 207. For example, various kinds of screens and a QR code to be described later are displayed on the operation panel 208. Here, a QR code, which is a two-dimensional code, has been described as an example of a code image; however, it is not intended to limit the present invention, and any other code image may be adopted. When the user operates the operation panel 208, the image forming apparatus 101 obtains an event corresponding to the user operation via the operation I/F 207.

The print controller 209 is connected to the print engine 210. Image data to be printed is transferred to the print engine 210 via the print controller 209. The print engine 210 receives control commands and image data to be printed and forms an image based on the image data on a sheet. The printing method of the print engine 210 may be an electrophotographic method or an inkjet method. In the case of the electrophotographic method, an image is formed by an electrostatic latent image being formed on a photosensitive element and then being developed by using toner, that toner image being transferred to the sheet, and the transferred toner image being fixed. Meanwhile, in the case of the inkjet method, an image is formed on a sheet by ink being discharged.

The scan controller 211 is connected to the scanner 212. The scanner 212 reads the image on a sheet and generates image data. The image data generated by the scanner 212 is stored in the storage 205. The image forming apparatus 101 may form an image on the sheet by using the image data generated by the scanner 212. The scanner 212 includes a document feeder (not illustrated) and can read sheets that have been placed on the document feeder while conveying them one by one.

<Hardware Configuration of Information Terminal>

Figure 3:
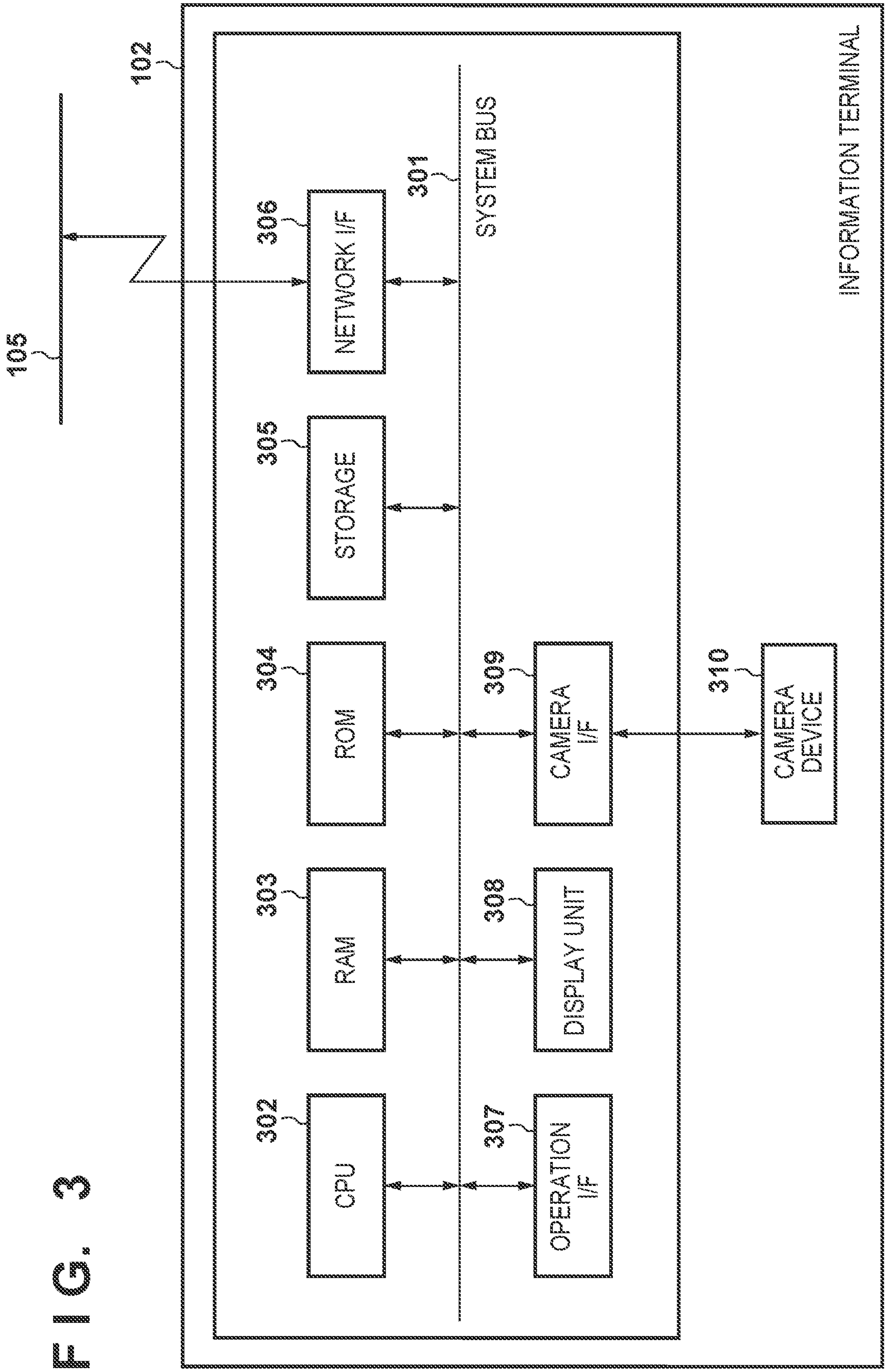
FIG. 3 is a diagram illustrating an example of a hardware configuration of an information terminal according to one embodiment.

Next, an example of a hardware configuration of the information terminal 102 according to the present embodiment will be described with reference to FIG. 3. The information terminal 102 includes a CPU 302, a RAM 303, a ROM 304, a storage 305, a network I/F 306, an operation unit 307, and a display unit 308, which are connected to a system bus 301.

The CPU 302 is a central processing unit that controls the operation of the entire information terminal 102. The RAM 303 is a volatile memory. The ROM 304 is a non-volatile memory and stores a startup program for the CPU 302. The storage 305 is a storage device (e.g., a hard disk drive (HDD)) that has a larger capacity than the RAM 303. The storage 305 may be a solid state drive (SSD) or the like and may be replaced by another storage device having functions that are similar to the hard disk drive.

The CPU 302 executes the startup program stored in the ROM 304 at the time of startup, such as when the power is turned on. The startup program reads out a control program stored in the storage 305 and loads the control program into the RAM 303. Upon executing the startup program, the CPU 302 goes on to execute the control program that has been loaded into the RAM 303 and performs control. The CPU 302 also stores, in the RAM 303, data to be used during control program execution and reads from and writes to the data. The storage 305 further stores various kinds of settings that are necessary for when the control program is executed and a hierarchy deterministic (HD) wallet, which is a mechanism for creating private keys hierarchically. The storage 305 also stores an HD wallet program for managing the HD wallet, a QR code reader application, and a viewer application, and information is read and written by the CPU 302.

The CPU 302 also transmits various kinds of settings that are necessary for performing printing in the image forming apparatus 101 as well as print instructions via the network I/F 306. The information terminal 102 transmits transaction data related to the information terminal to the blockchain network 104 via the network I/F 306. The information terminal 102 can receive the content of operations/inputs/instructions performed by the user via the operation unit 307. Further, the information terminal 102 can display the content controlled by the CPU 302 on the display unit 308.

The CPU 302 also controls a camera device 310 via a camera I/F 309. The camera device 310 captures an image of an object by using a built-in image capturing device (not illustrated) and, after converting the captured image into electronic data, can transmit the electronic data to the RAM 303 of the information terminal 102 via the camera I/F 309. In addition, the CPU 302 can convert image data of a QR code that has been captured by the camera device 310 into character string data using the QR code reader application.

The storage 305 also stores encryption private keys that have been generated by the HD wallet and encryption public keys that have been generated from the encryption private keys. The CPU 302 can decrypt, using an encryption private key, data that has been encrypted using an encryption public key. For example, there are usage methods such as that in which the management server 103 transmits, to the information terminal 102, image data that has been encrypted using an encryption public key of the information terminal 102 and then the CPU 302 of the information terminal 102 decrypts the image data by using an encryption private key of the storage 305 and displays an image on the display unit 308 using the viewer application.

<Hardware Configuration of Management Server>

Figure 4:
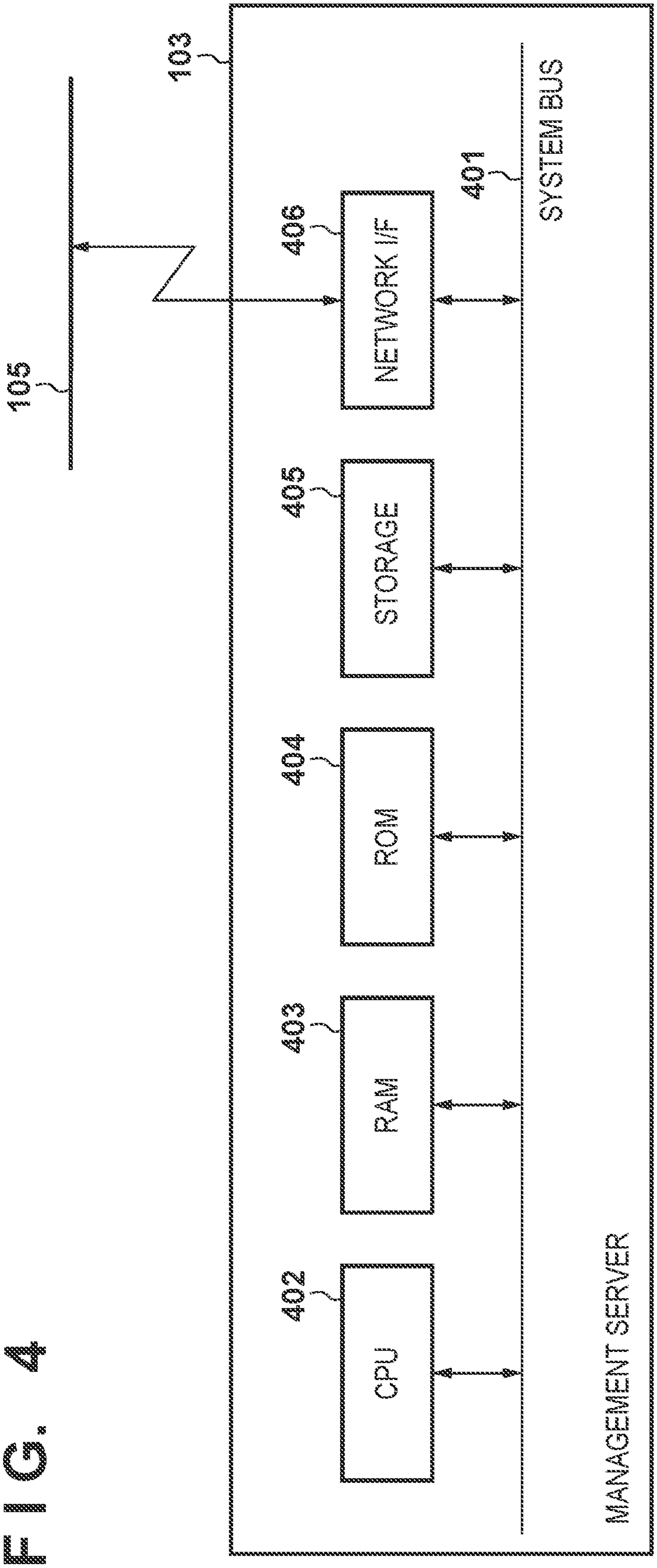
FIG. 4 is a diagram illustrating an example of a hardware configuration of a management server according to one embodiment.

Next, an example of a hardware configuration of the management server 103 according to the present embodiment will be described with reference to FIG. 4. The management server 103 includes a CPU 402, a RAM 403, a ROM 404, the storage 405, and a network I/F 406, which are connected to a system bus 401.

The CPU 402 is a central processing unit that controls the operation of the entire management server 103. The RAM 403 is a volatile memory. The ROM 404 is a non-volatile memory and stores a startup program for the CPU 402. The storage 405 is a storage device (e.g., a hard disk drive (HDD)) that has a larger capacity than the RAM 403 and stores image data whose ownership is managed on the blockchain network 104 as well as token data. The storage 405 may be a solid state drive (SSD) or the like and may be replaced by another storage device having functions that are similar to the hard disk drive.

The CPU 402 transmits image data to the image forming apparatus 101 or the information terminal 102 via the network I/F 406. The CPU 402 obtains transactions that are on the blockchain network 104 via the network I/F 406.

The management server 103 can receive a Hypertext Transfer Protocol (HTTP) request at the authentication token obtainment request URI, "http://aaa.com/login", via the network I/F 406. The management server 103 can also receive an HTTP request at the file list obtainment request URI, "http://aaa.com/fileList", and the image obtainment request URI, "http://aaa.com/images".

<Wallet Registration in Image Forming Apparatus>

Next, a wallet registration procedure in the image forming apparatus 101 according to the present embodiment will be described with reference to FIG. 18. In order to use the blockchain, it is necessary to generate a private key for each transaction, using a wallet. Accordingly, a private key is generated from a wallet (seed phrase) by the aforementioned HD wallet program, and it is desirable to register the wallet in advance.

Figure 18:
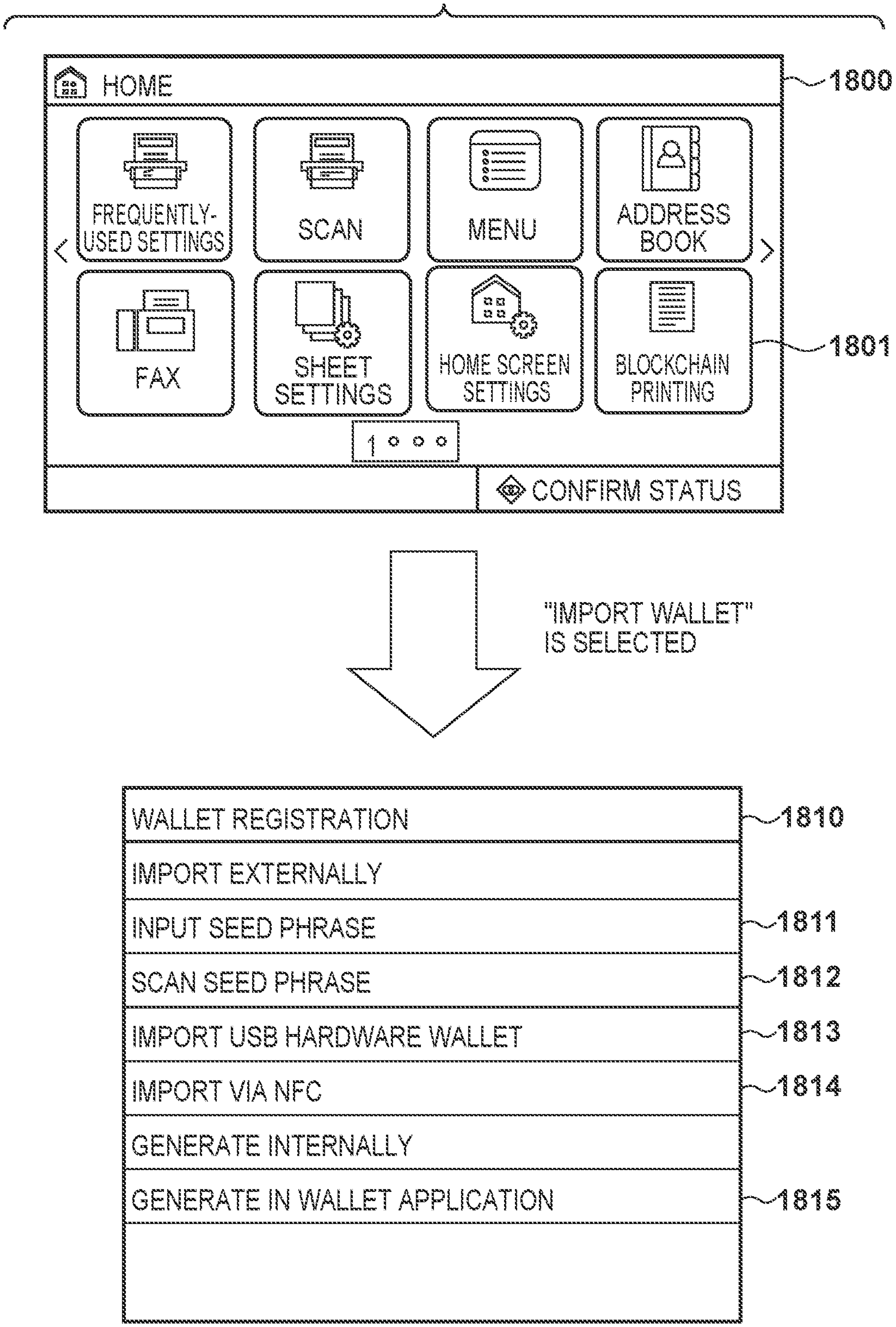
FIG. 18 is a diagram illustrating an example of a wallet registration procedure according to one embodiment.

A home screen 1800 illustrated in FIG. 18 is displayed on the operation panel 208. In the home screen 1800, a state in which wallet registration 1801 can be selected is indicated. When the wallet registration 1801 is operated, a wallet registration application is started and a wallet registration screen 1810 of the application is transitioned to. When broadly divided, there are two methods of registering a wallet: externally importing a wallet and internally generating a wallet. In the wallet registration screen 1810, four buttons 1811 to 1814 are displayed in a selectable manner as options for when externally importing a wallet, and one button 1815 is displayed in a selectable manner as an option for when internally generating a wallet.

When the button 1811 is selected, a screen in which the user manually inputs a seed phrase is transitioned to. When the button 1812 is selected, a seed phrase is obtained by a printed material on which the seed phrase has been printed in advance being read by scanning. Accordingly, when the button 1812 is selected, a screen prompting the user to place the printed matter at a predetermined position and operate a button for starting reading is transitioned to.

When the button 1813 is selected, a wallet that is stored in hardware that can be connected to the image forming apparatus 101 via a USB interface, such as a USB memory or a portable HDD, is obtained. Thus, when the button 1813 is selected, a screen prompting to connect a predetermined hardware to a USB interface is transitioned to. Then, if a plurality of wallets are stored in the connected hardware, a screen for selecting a desired wallet from the plurality of wallets may be transitioned to. When the button 1814 is selected, a wallet is obtained from a device that is connected by near-field communication. Thus, when the button 1814 is selected, devices that can be connected by near-field communication are displayed in a selectable manner. Then, when near-field communication is established with a predetermined device, obtainment of wallet from the device is started. As described above, if a plurality of wallets are stored in the device, a screen for selecting a desired wallet from the plurality of wallets may be transitioned to.

When the button 1815 is selected, a wallet generation application stored in the image forming apparatus 101 is started, a random number is generated, and a wallet is generated by using a seed phrase for which the random number has been hashed with a hash function. The application stores the generated wallet in the storage 205 or the like. In addition, the application may control, for the generated wallet, display on the operation panel 208, printing onto a sheet, and output to a desired USB device via a USB interface in a selectable manner.

<Print Sequence>

Figure 5A:
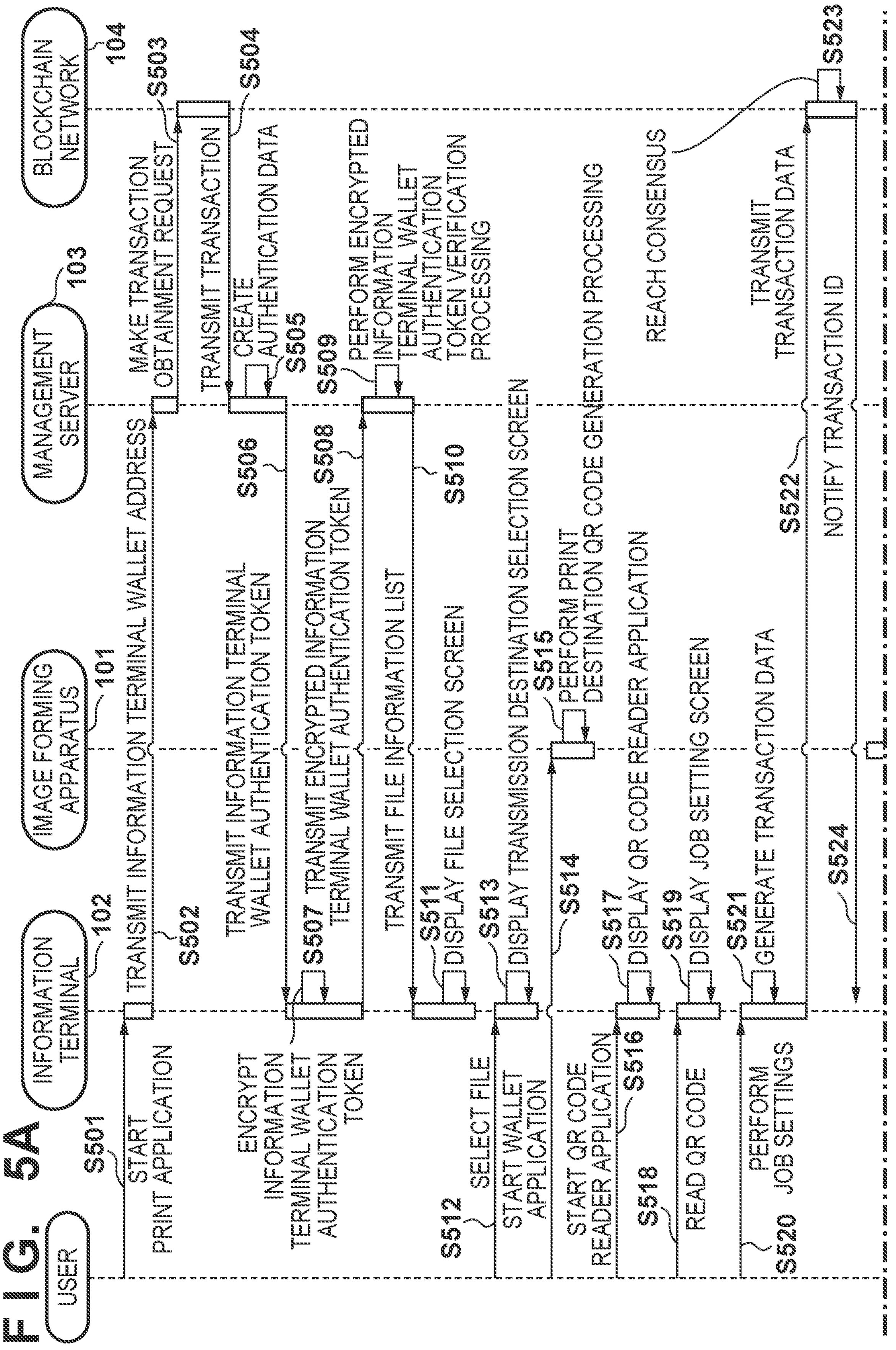
FIGS. 5A and 5B are a diagram illustrating a sequence of print processing according to one embodiment.
Figure 5B:
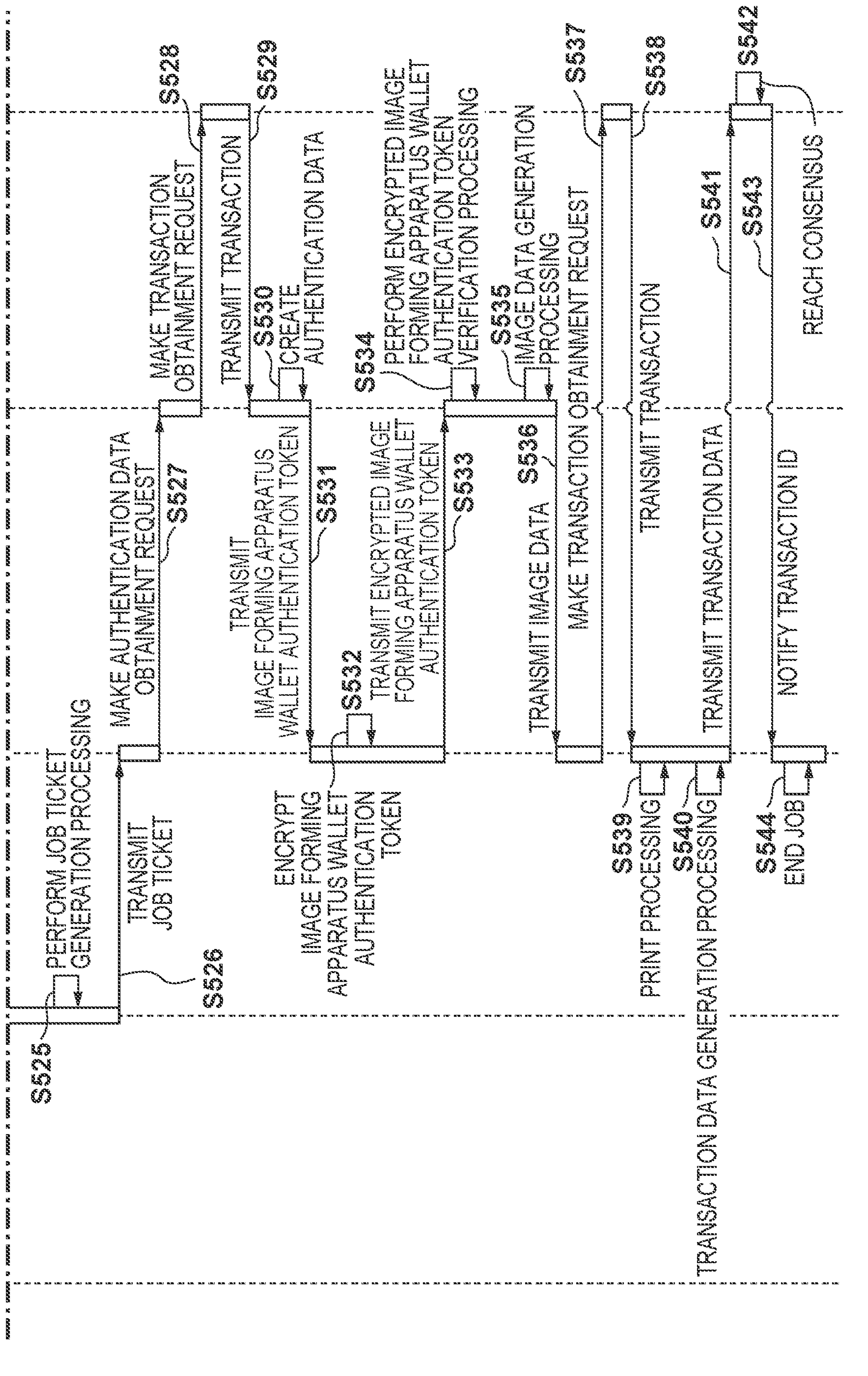

Next, a sequence for when executing a print job in the printing system according to the present embodiment will be described with reference to FIGS. 5A-5B. The processing procedure to be described below is only an example and is not intended to limit the present invention. For example, a predetermined process to be described below may be performed by another device, or the processing order may be changed within possible extent. In the following sequence, it is assumed that the wallet has already been generated and registered in the image forming apparatus 101.

In step S501, the CPU 302 of the information terminal 102 receives the start of the print application performed by the user. In step S502, the CPU 302 transmits transaction data to the blockchain URL "http://bc1.io" via the network I/F 306. Specifically, the CPU 302 transmits an HTTP GET request to the authentication token obtainment request URI of the management server 103, "http://aaa.com/login", with a user wallet address stored in the storage 305 attached.

In step S503, the CPU 402 of the management server 103 makes a transaction obtainment request to the blockchain network 104 via the network I/F 406 using the user wallet address obtained in step S502. In step S504, the blockchain network 104 transmits transactions (1601 and 1604 of FIGS. 16A-16B) whose ownership is held by the wallet address of the transaction obtainment request received in step S503 to the management server 103.

In step S505, the CPU 402 of the management server 103 generates a random number and stores the generated random number in the RAM 403 as an authentication token. The CPU 402 also stores in the RAM 403 an owner verification public key of the transactions obtained in step S504 as a verification public key. Subsequently, in step S506, the CPU 402 transmits the authentication token generated in step S505 to the information terminal 102 via the network I/F 406.

Next, in step S507, the CPU 302 of the information terminal 102 encrypts the information terminal wallet authentication token received in step S506 by using the information terminal verification private key stored in the storage 305. Then, in step S508, the CPU 302 transmits the user wallet address stored in the storage 305 and an HTTP GET request to which the information terminal wallet authentication token encrypted in step S506 has been attached to the management server 103 via the network I/F 306. Specifically, the CPU 302 transmits an HTTP GET request to the file list obtainment request URI of the management server 103, "http://aaa.com/fileList".

In step S509, the CPU 402 of the management server 103 stores, in encrypted authentication tokens in the RAM 403, the encrypted information terminal wallet authentication token obtained in step S508 and executes wallet verification processing. The details of the wallet verification processing will be described later with reference to FIG. 11. Subsequently, in step S510, the CPU 402 generates file information data and transmits a file information list (FIG. 14), which is JSON data in which the file information data (electronic data) is listed, to the information terminal 102 via the network I/F 406. The file information data is generated for each file whose ownership is held by the blockchain address received in step S502. The file information data includes the transaction IDs (transactionID) and the token IDs (tokenID) of the transactions obtained in step S504. In addition, the file information data includes displayName and icon of the token stored in the storage 405 corresponding to the token IDs of the transactions obtained in step S504. When the user manages the ownership of the electronic data using a plurality of user wallet addresses, the control may be such that the process from step S508 to step S510 is executed for each user wallet address and the file information lists obtained in the respective processes are combined.

Figure 6:
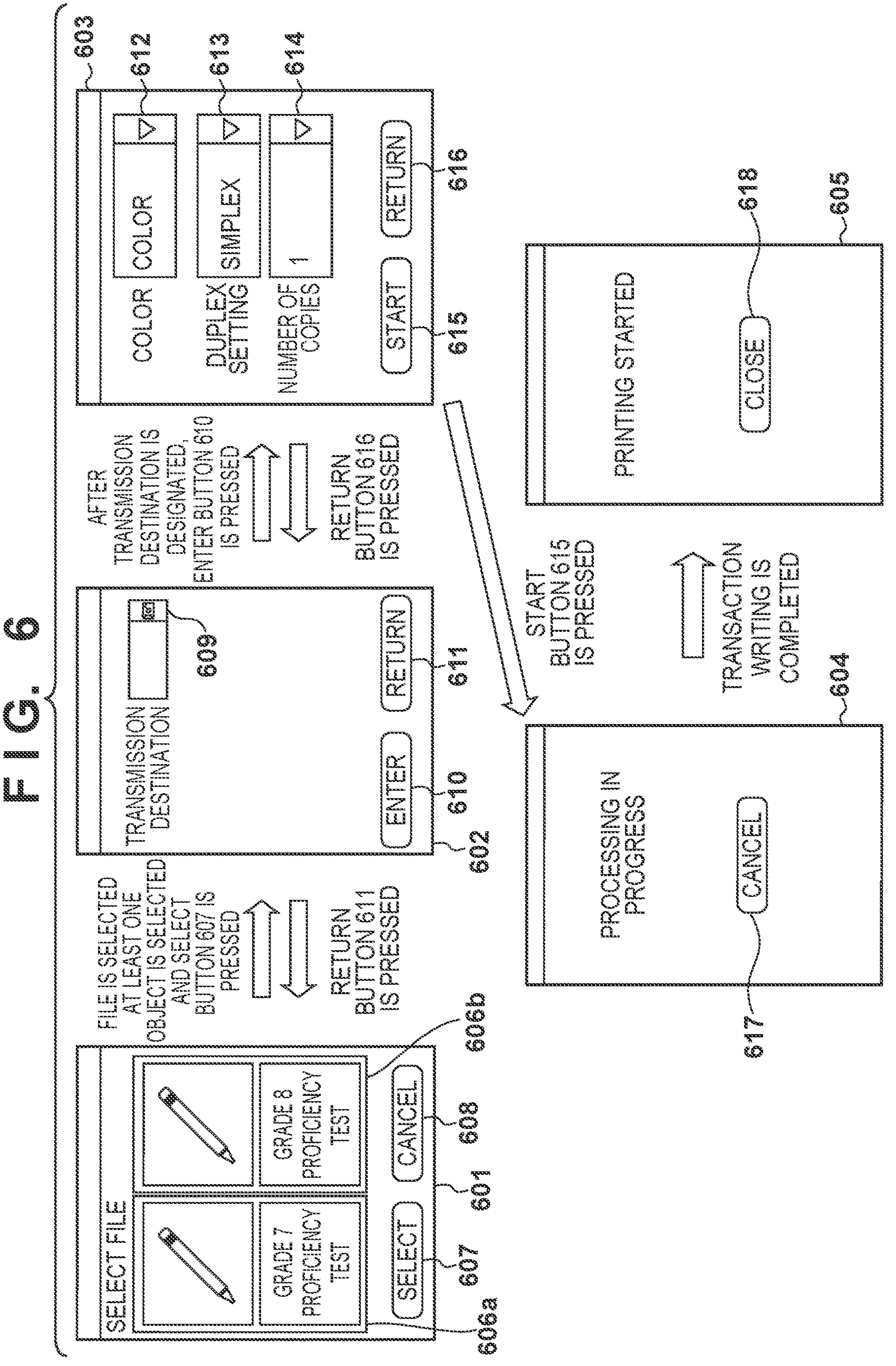
FIG. 6 is a diagram illustrating a flow of screens of a wallet application to be executed by the information terminal according to one embodiment.

Next, in step S511, the CPU 302 of the information terminal 102 displays a file selection screen 601 on the display unit 308 according to the received file information list. The file selection screen 601 illustrated in FIG. 6 includes, for respective pieces of file information data of the file information list received in step S510, file selection objects 606*a* and 606*b*, each including displayName and an image generated based on icon. The file selection screen 601 further includes a select button 607 and a cancel button 608. Then, in step S512, the CPU 302 receives selection of a file to be printed by the user performing an operation in a region of the file selection object 606*a* or 606*b* in the file selection screen 601 of the information terminal 102. When the operation of the select button 607 is received, in step S513 the CPU 302 stores in the RAM 303 the file information data corresponding to the file selected in step S512 and then displays a transmission destination selection screen 602 on the display unit 308.

Figure 7:
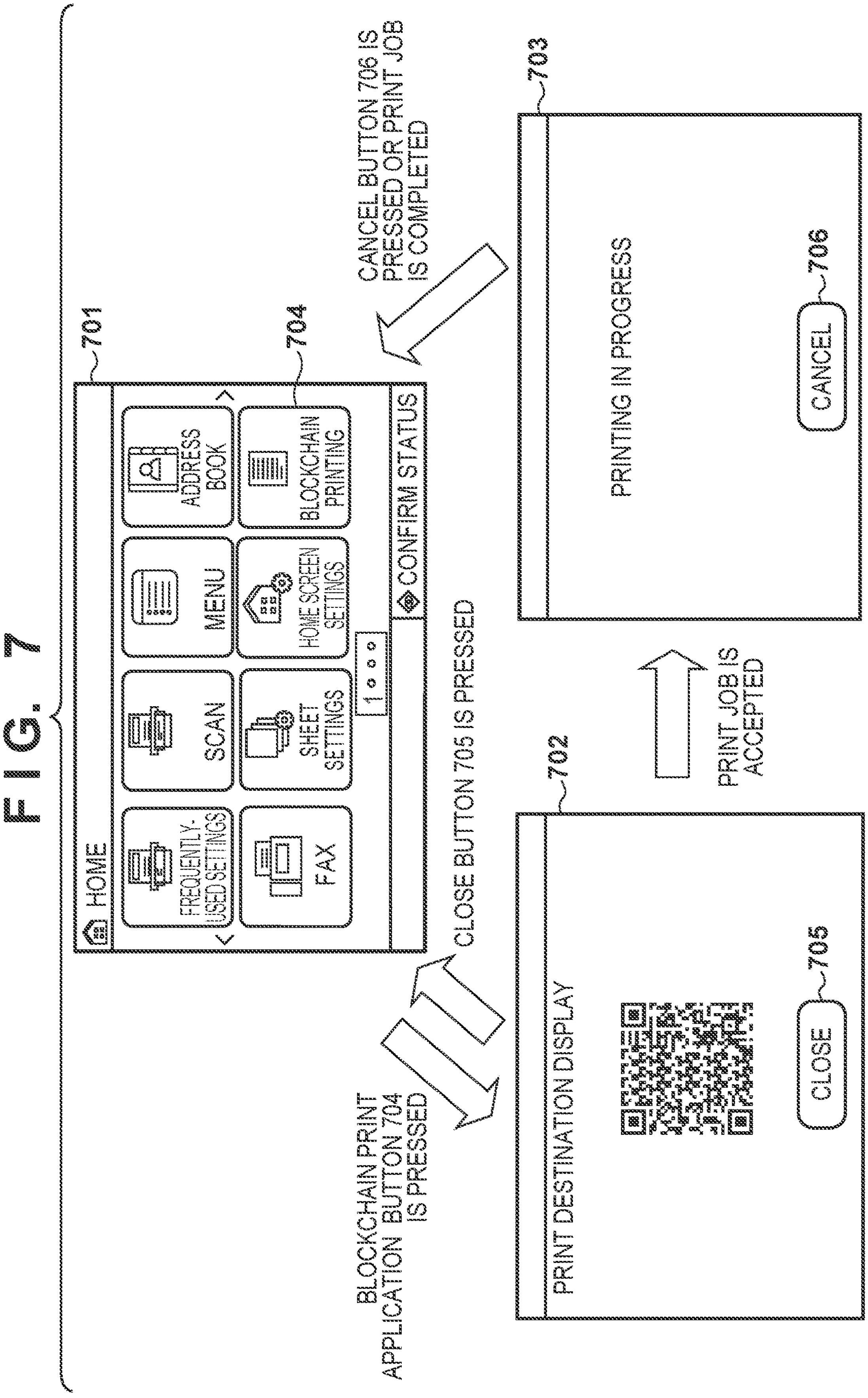
FIG. 7 is a diagram illustrating a flow of screens of a print application to be of the image forming apparatus according to one embodiment.

In step S514, the CPU 202 of the image forming apparatus 101 receives a press of a blockchain print application button 704 by the user on a home screen 701 of FIG. 7 displayed on the operation panel 208. Subsequently, in step S515, the CPU 202 executes print destination QR code generation processing (FIG. 8) and displays on the operation panel 208 a print destination display screen 702, which includes the generated print destination QR code.

Subsequently, in step S516, the CPU 302 of the information terminal 102 receives a press of a QR code reader start button 609 of the transmission destination selection screen 602 of the information terminal 102 by the user. Then, in step S517, the CPU 302 calls the QR code reader application stored in the storage 305 and displays a QR code image capturing screen (not illustrated).

In step S518, the CPU 302 reads the QR code of the print destination display screen 702 in the QR code reader application according to the user operation. Specifically, the user captures an image of the QR code of the print destination display screen 702, which is displayed in the image forming apparatus 101, by using the camera of the information terminal 102, and thus reads the information of the QR code. Subsequently, in step S519 the CPU 302 stores, in the RAM 303, print destination information (FIG. 15) obtained by performing processing to decode the read QR code and displays a job setting screen 603 on the display unit 308. Then, in step S520, the CPU 302 accepts job settings via the job setting screen 603 of the information terminal 102 according to a user operation and, upon accepting the operation of an enter button 615, proceeds to step S521.

In step S521, the CPU 302 stores in the RAM 303 the job settings selected in step S520 and then creates a previous transaction digest, "0x7895aca 304d456b8", for which the previous transaction (1601) has been hashed by using a hash function. The CPU 302 generates the previous transaction digest and temporary transaction data for which various kinds of parameters have been set. In addition, the CPU 302 generates transaction data related to the information terminal, which contains the temporary transaction data and a digital certificate digest, "0xada987ad097ea", for which the temporary transaction data has been encrypted by using the information terminal verification private key. In the above set parameters, the user wallet address, "0xad172adf867bba6c", stored in the storage 305 is set as a sender. In addition, in the above parameters, a wallet address of the image forming apparatus 101, "0x545e39ibda572e52", is set as a receiver. Further, in the above parameters, "1" is set as a token ID, and the information terminal validation public key, "0x4ad654baac9e0cc3", which has been generated as the owner verification public key from the information terminal verification private key, is set. Further, in the above parameters, the data encryption public key "0xa65498caba100add", which has been obtained from the print destination information, is set in the data encryption public key and the role, "Rent", which represents rental, is set in the role. Furthermore, in the above parameters, "2020/1/1 12:30:00", which is the rental expiration date, is set in the expiration date, and "0" is set in the number of printed copies. The various kinds of set parameters are only an example and are not intended to limit the present invention. Appropriate parameters may be set according to the system in which the present invention is to be applied. Then, in step S522, the CPU 302 transmits the transaction data related to the information terminal generated in step S521 to the blockchain network 104 via the network I/F 306 and displays a processing-in-progress screen 604 illustrated in FIG. 6 on the display unit 308.

Next, in step S523, the blockchain network 104 verifies the transaction data related to the information terminal received in step S522, using a consensus algorithm. Upon completion of verification, the blockchain network 104 writes the transaction (1602) for which the parameters related to the transaction and the transaction data related to the information terminal have been combined. The parameters related to the transaction include the transaction ID, "0xa456adf87421cab3", which is for specifying the transaction, and the time stamp, "2020/1/1 12:00:00", which is the time at which the transaction was generated. Subsequently, in step S524, the blockchain network 104 notifies the information terminal 102 of the transaction ID of the transaction (1602) written in step S523.

Next, in step S525, the CPU 302 of the information terminal 102 executes job ticket generation processing. The details of the job ticket generation processing will be described later with reference to FIG. 9. In step S526, the CPU 302 transmits the job ticket generated in step S525 to a job URI stored in the QR code internal information of the RAM 303 via the network I/F 306 and displays a job transmission complete screen 605 on the display unit 308. For example, a message indicating that printing has been started is displayed on the job transmission complete screen 605. Subsequently, in step S527, the CPU 202 of the image forming apparatus 101 transmits an HTTP GET request to the management server 103 based on the information obtained in the job ticket. Specifically, the CPU 202 transmits an HTTP GET request to the obtained authentication token obtainment request URI of the management server 103, "http://aaa.com/login", with the obtained transaction ID attached.

Next, in step S528, the CPU 402 of the management server 103 makes a transaction obtainment request to the blockchain network 104 via the network I/F 406 using the transaction ID obtained in step S527. Then, in step S529, the blockchain network 104 transmits a transaction (1602) corresponding to the transaction ID of the transaction request received in step S528 to the management server 103.

In step S530, the CPU 402 of the management server 103 generates a random number and stores the generated random number in the RAM 403 as an authentication token. The CPU 402 stores in the RAM 403 the transaction (1602) obtained in step S529 and stores in the RAM 403 the owner verification public key of the transaction (1602) as a verification public key. Subsequently, in step S531, the CPU 402 transmits the authentication token generated in step S530 to the image forming apparatus 101 via the network I/F 406.

In step S532, the CPU 202 of the image forming apparatus 101 generates an image forming apparatus wallet authentication token for which the authentication token received in step S531 has been encrypted by using an image forming apparatus verification private key stored in the storage 205. Subsequently, in step S533, the CPU 202 transmits an HTTP GET request to the image obtainment request URI of the management server 103, "http://aaa.com/image", which has been obtained by using the job ticket, via the network I/F 206. The image forming apparatus wallet authentication token encrypted in step S532 and the transaction ID obtained by using the job ticket are attached to the HTTP GET request.

Figure 10:
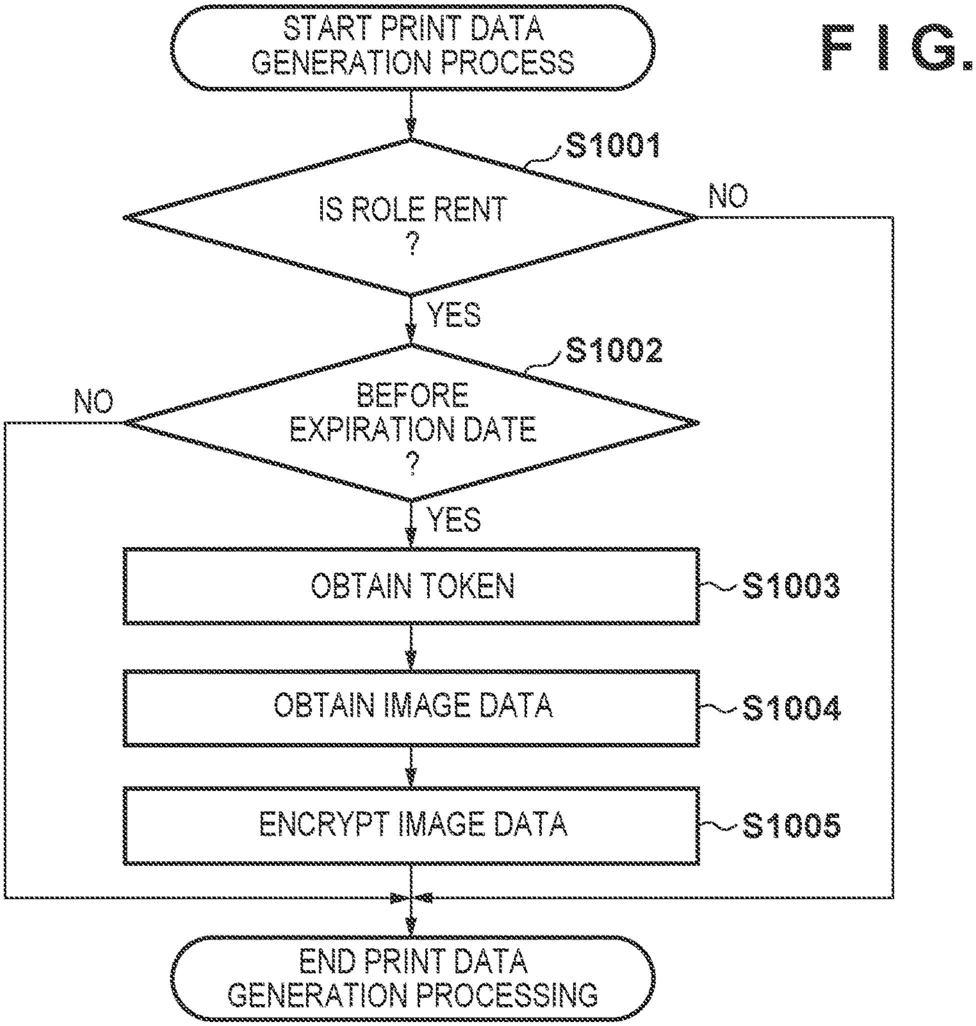
FIG. 10 is a flowchart for explaining an example of print image data generation processing of the management server according to one embodiment.
Figure 11:
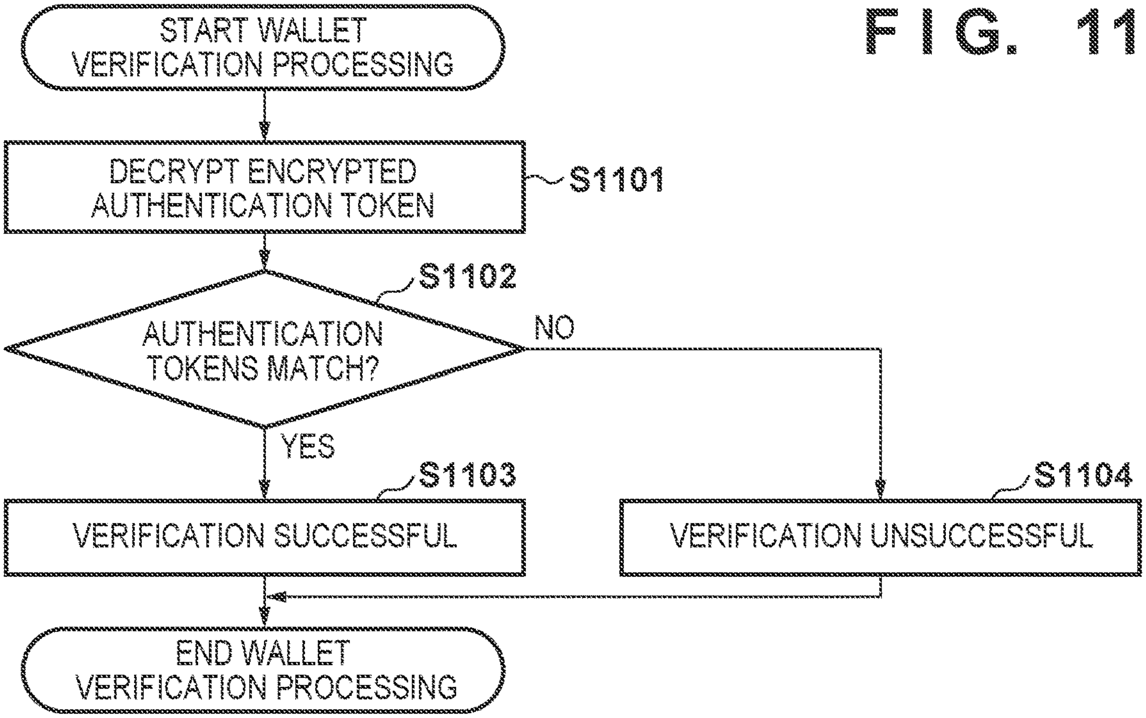
FIG. 11 is a flowchart for explaining an example of wallet verification processing of the management server according to one embodiment.

Next, in step S534, the CPU 402 of the management server 103 stores, in encrypted authentication tokens of the RAM 403, the image forming apparatus wallet authentication token obtained in step S533 and executes wallet verification processing (FIG. 11). Subsequently, in step S535, the CPU 402 executes print image data generation processing (FIG. 10). In addition, in step S536, the CPU 402 transmits the encrypted image data generated in step S535 to the image forming apparatus 101 via the network I/F 406.

In step S537, the CPU 202 of the image forming apparatus 101 stores in an image buffer of the RAM 403 the image data received in step S536. In addition, the CPU 202 makes an obtainment request for the transaction (1602) to the blockchain network 104 via the network I/F 406 with the transaction ID obtained with the job ticket attached. In step S538, the blockchain network 104 transmits transaction data (1602) corresponding to the transaction ID of the transaction request received in step S537 the image forming apparatus 101.

Figure 12:
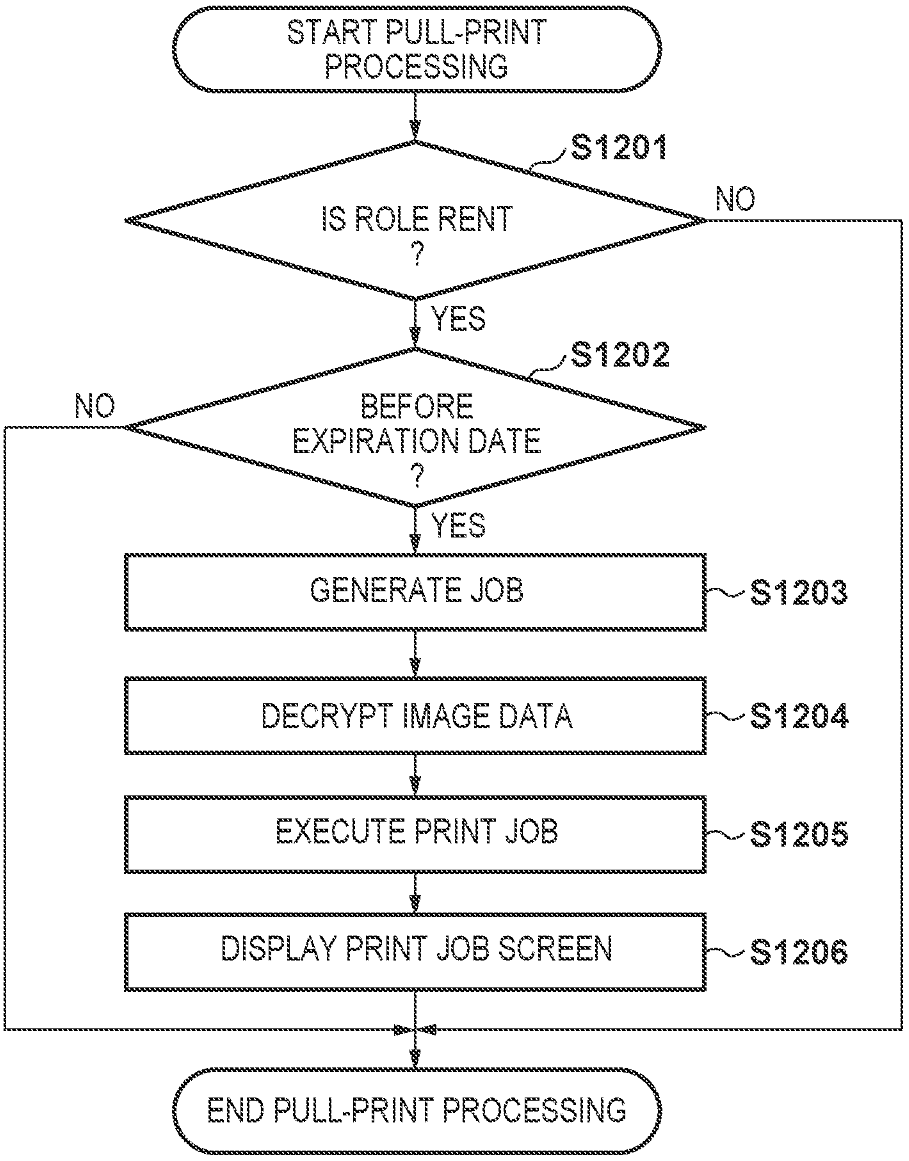
FIG. 12 is a flowchart for explaining an example of pull-print processing of the image forming apparatus according to one embodiment.

In step S539, the CPU 202 of the image forming apparatus 101 executes print processing (FIG. 12). Subsequently, in step S540, the CPU 202 generates a transaction that contains history information related to printing. First, the CPU 202 creates a previous transaction digest, "0xcc098afa0bada098", for which a previous transaction (1602) has been hashed by using a hash function. Subsequently, the CPU 202 generates, in addition to the previous transaction digest, temporary transaction data for which various kinds of parameters have been set. In addition, the CPU 202 generates transaction data related to the image forming apparatus, which contains the temporary transaction data and a digital certificate digest, "0x7ba8991ceef15329", for which the temporary transaction data has been encrypted by using the information terminal verification private key. The above various kinds of parameters, which are set in the temporary transaction data, include the following parameters. The wallet address of the image forming apparatus 101, "0x545e39ibda572e52", which is stored in the storage 205, is included as a sender. The wallet address, "0xad172adf867bba6c", which has been obtained from the job ticket, is included as a receiver, and "1" is included as the token ID. In addition, an image forming apparatus verification public key, "0x15879cd0d99e16f3", generated from the image forming apparatus verification private key is included as the owner verification public key. cryptoKey, "0xa98321dbd7d7a92d", obtained from the job ticket is included as the data encryption public key, and "Return", which indicates the return of ownership, is included as a role. In addition, "None", which indicates that there is no rental expiration date, is included as the expiration date, and "1" is included as the number of printed copies. These parameter values are only an example and are not intended to limit the present invention. Then, in step S541, the CPU 202 of the image forming apparatus 101 transmits the transaction data related to the image forming apparatus stored in the RAM 403 to the blockchain network 104 via the network I/F 206.

The above number of printed copies is the history information related to printing. However, the history information of the present invention is not intended to be limited to only the number of printed copies, and any other parameter may be set. For example, the number of printed sheets or the number of pages may be used, or both the number of printed copies and the number of printed sheets (or the number of pages) may be used as parameters. The used size of sheet and color settings may be included in the history information in association with the number of printed copies, the number of printed sheets, and the number of pages.

Meanwhile, in step S542, the blockchain network 104 verifies the transaction data related to the image forming apparatus received in step S541, using a consensus algorithm. Upon completion of verification, the CPU 202 writes the transaction (1603) for which the parameters related to the transaction and the transaction data related to the information terminal have been combined. The parameters related to the transaction include the transaction ID, "0x197db78226479c1a", which is for specifying the transaction, and the time stamp, "2020/1/1 12:01:00", which is the time at which the transaction was generated. In step S543, the blockchain network 104 notifies the image forming apparatus 101 of the transaction ID of the transaction (1603) written in step S542. In step S544, the CPU 202 of the image forming apparatus 101 displays the home screen 701 and ends the process of the print sequence. Here, the blockchain print sequence according to the present embodiment has been described but is not intended to limited the present invention. For example, each of the above processes may be executed in another device within the scope of problems to be solved by the present invention and the processing procedure may be changed freely.

<Print Destination QR Code Generation Processing>

Figure 8:
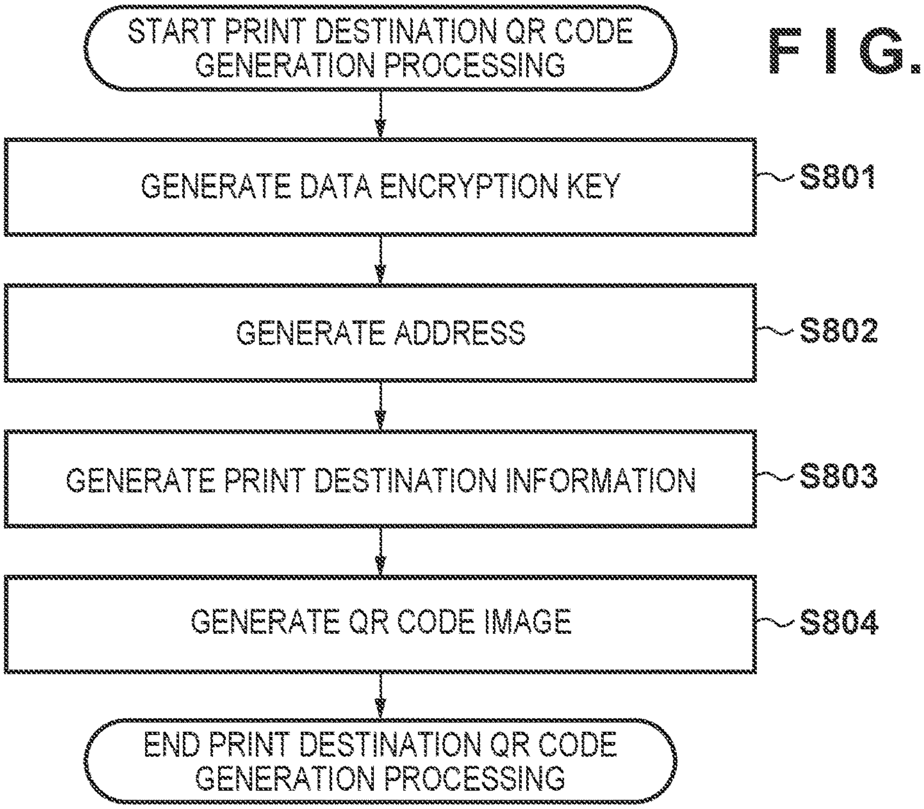
FIG. 8 is a flowchart for explaining an example of print destination QR code generation processing of the image forming apparatus according to one embodiment.

Next, the processing procedure of the print destination QR code generation processing (step S515) to be executed by the image forming apparatus 101 according to the present embodiment will be described with reference to FIG. 8. The process to be described below is realized, for example, by the CPU 202 reading out to the RAM 203 a program stored in a memory, such as the ROM 204 or the storage 205, and executing the program. As described with reference to FIG. 18, the following process is performed using a pre-registered wallet (seed phrase).

First, in step S801, the CPU 202 generates a data encryption private key and a data encryption public key using an HD wallet program stored in the storage 205 and stores each key in the storage 205. Subsequently, in step S802, the CPU 202 generates an image forming apparatus verification private key and an image forming apparatus verification public key from the HD wallet stored in the storage 205 and an image forming apparatus wallet address from the image forming apparatus verification public key and stores each item in the storage 205.

Next, in step S803, the CPU 202 creates print destination information (FIG. 15) using the information stored in the storage 205. Specifically, the CPU 202 creates print destination information by turning the data encryption public key, the image forming apparatus verification public key, the image forming apparatus wallet address, and a print job execution URI stored in the storage 205 into JSON data. Subsequently, in step S804, the CPU 202 calls the QR code encoder of the ROM 204 and converts the QR code internal information created in step S803 into a QR code image. In addition, in step S805, the CPU 202 displays the QR code image generated in step S803 on the operation panel 208 and terminates the process of the flowchart.

<Job Ticket Generation Processing>

Figure 9:
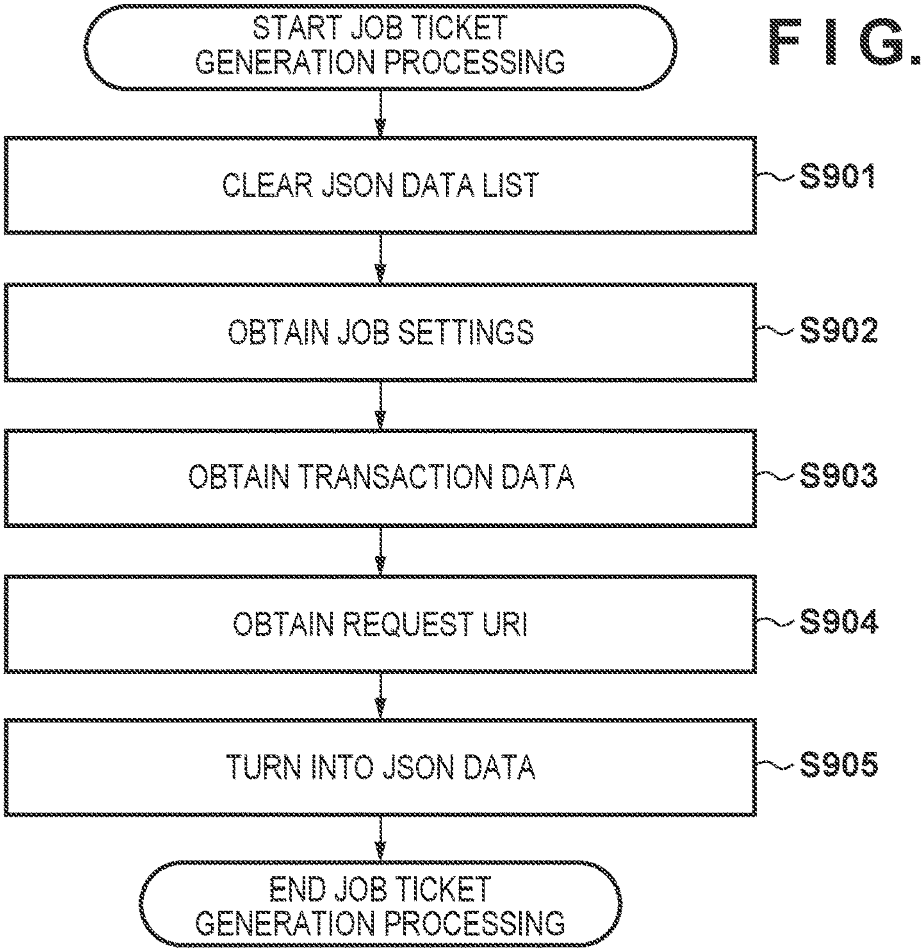
FIG. 9 is a flowchart for explaining an example of job ticket generation processing of the information terminal according to one embodiment.

Next, the processing procedure of the job ticket generation processing (step S525) to be executed by the information terminal 102 according to the present embodiment will be described with reference to FIG. 9. The process to be described below is realized, for example, by the CPU 302 reading out to the RAM 303 a program stored in a memory, such as the ROM 304 or the storage 305, and executing the program.

In step S901, the CPU 302 deletes all elements from a JSON data list, which is a character string list data region stored in the RAM 303. Subsequently, in step S902, the CPU 302 obtains the job settings stored in the RAM 303 and generates a character string, '“colorMode”:“color”', based on the information that the color mode setting in the job settings is “color”. The CPU 302 also generates a character string, '“duplex”:“simplex”', based on the information that the duplex setting in the job settings is “simplex”. The CPU 302 also generates a character string, '“copies”:“1”', based on the information that the number of copies in the job settings is “1”. In addition, the CPU 302 adds each generated character string to the JSON data list of the RAM 303.

In step S903, the CPU 302 obtains the transaction stored in the RAM 303 and generates each of the following character strings. The CPU 302 generates a character string, '“walletAddress”:“0xad172adf867bba6c”', from the wallet address of the transaction, “0xad172adf867bba6c”. The CPU 302 generates a character string, '“transaction ID”: “0xa456adf87421cab3”', from the transaction ID of the transaction, “0xa456adf87421cab3”. In addition, the CPU 302 adds each generated character string to the JSON data list of the RAM 303.

In step S904, the CPU 302 generates a character string, '“loginURL”:“http://aaa.com/login”', from the authentication token obtainment request URI, “http://aaa.com/login”, stored in the storage 305. The CPU 302 also generates a character string, '“imageURL”:“http://aaa.com/images”', from the image obtainment request URI, “http://aaa.com/images”. In addition, the CPU 302 adds each character string to the JSON data list of the RAM 303.

In step S905, the CPU 302 obtains the encryption public key from the storage 305. In addition, the CPU 302 generates a character string, '“cryptoKey”: “0x15879cd0d99e16f3”', from the obtained encryption public key, “0x15879cd0d99e16f3”, and adds it to the JSON data list of the RAM 303. Finally, in step S906, the CPU 302 creates a job ticket (FIG. 17) in which a JSON data list stored in the RAM 303 has been turned into JSON data and ends the process of the flowchart.

<Print Image Data Generation Processing>

Next, the processing procedure of the print image data generation processing (step S535) to be executed by the management server 103 according to the present embodiment will be described with reference to FIG. 10. The process to be described below is realized, for example, by the CPU 402 reading out to the RAM 403 a program stored in a memory, such as the ROM 404 or the storage 405, and executing the program.

In step S1001, the CPU 402 determines whether the role of the transaction stored in the RAM 403 is “Rent”. If it is determined in step S1001 that the role is “Rent”, in step S1002 the CPU 402 determines whether the expiration date of the transaction stored in the RAM 403 is a time later than the present time. If it is determined in step S1002 that the time of the expiration date is later than the present time, in step S1003 the CPU 402 obtains from the storage 405 the token 1300 corresponding to the token ID “1” of the transaction stored in the RAM 403.

Next, in step S1004, the CPU 402 obtains from the storage 405 the image file stored in the file path, “\\aaa\bbb.pdf”, of the token 1300 obtained in step S1003 and stores the image file in the image files of the RAM 403. Subsequently, in step S1005, the CPU 402 encrypts the image data of the RAM 403 using the data encryption public key of the transaction, “0xa65498caba100add”. Further, the CPU 402 stores the encrypted image data in the encrypted image data of the RAM 403 and terminates the process of the present flowchart. Meanwhile, when it is determined in step S1001 that the role is not “Rent” or when the time of the expiration date is before the present time in step S1002, the process of the flowchart ends.

<Wallet Verification Processing>

Next, the processing procedure of the wallet verification processing (step S534) to be executed by the management server 103 according to the present embodiment will be described with reference to FIG. 11. The process to be described below is realized, for example, by the CPU 402 reading out to the RAM 403 a program stored in a memory, such as the ROM 404 or the storage 405, and executing the program.

In step S1101, the CPU 402 obtains the encrypted authentication token stored in the RAM 403, decrypts the authentication token by using the verification public key stored in the RAM 403, and obtains the decrypted authentication token. Subsequently, in step S1102, the CPU 402 determines whether the authentication token stored in the RAM 403 matches the decrypted authentication token.

If it is determined in step S1102 that they match, in step S1103 the CPU 402 stores "successful" in the verification result of the RAM 403 and ends the process of the flowchart. Meanwhile, if it is determined in step S1102 that they do not match, in step S1104 the CPU 402 stores "unsuccessful" in the verification result of the RAM 403 and ends the process of the flowchart.

<Pull-Print Processing>

Next, the processing procedure of the pull-print processing (step S539) to be executed by the image forming apparatus 101 according to the present embodiment will be described with reference to FIG. 12. The process to be described below is realized, for example, by the CPU 202 reading out to the RAM 203 a program stored in a memory, such as the ROM 204 or the storage 205, and executing the program.

In step S1201, the CPU 202 determines whether the role of the transaction stored in the RAM 203 is "Rent". If it is determined in step S1201 that the role is "Rent", in step S1202 the CPU 202 determines whether the expiration date of the transaction stored in the RAM 203 is a time later than the present time.

If it is before the expiration date, in step S1203 the CPU 202 generates a job based on the job ticket (FIG. 17) stored in the RAM 203. For example, in the case of the job ticket illustrated in FIG. 17, the CPU 202 sets the color mode to "color" based on '"colorMode":"color"'. In addition, the CPU 202 generates a job in which the duplex setting is set to "simplex" based on '"duplex":"simplex"' of the job settings and the number of copies is set to "1" based on '"copies":"1"'. Further, the CPU 202 creates the job with the settings stored in the print job default settings (not illustrated) of the storage 205 of the image forming apparatus 101 for job settings other than the color mode, the duplex setting, and the number of copies and stores the job object in the RAM 203.

Next, in step S1204, the CPU 202 decrypts the image data stored in the image buffer of the RAM 203 by using the data encryption private key stored in the RAM 203 and stores the image data in a decrypted image data buffer of the RAM 203. Subsequently, in step S1205, the CPU 202 performs print processing of the image stored in the decrypted image data buffer of the RAM 203 based on the job object stored in the RAM 203.

In step S1206, the CPU 202 displays a job-in-execution screen 703 on the operation panel 208 and ends the process of the flowchart. Meanwhile, when it is determined in step S1201 that the role is not "Rent" or when the time of the expiration date is before the present time in step S1202, the process of the flowchart ends.

As described above, the image forming system according to the present embodiment is configured to include the information terminal, the image forming apparatus, and the management server in the blockchain network. Regarding electronic data for which the ownership is managed in a transaction of the blockchain network, the information terminal issues to the image forming apparatus a transaction for transferring or lending the ownership. The information terminal generates a job ticket for printing the electronic data based on the authentication information obtained from the image forming apparatus and transmits the job ticket to the image forming apparatus. The image forming apparatus obtains the job ticket for printing the electronic data from the information terminal. The image forming apparatus obtains the electronic data from the management server that manages the electronic data, using the information related to the transaction of transferring or lending from the information terminal to the image forming apparatus the ownership of the electronic data and included in the obtained job ticket. In addition, the image forming apparatus performs printing using the obtained electronic data and information related to the print settings of the job ticket and generates a transaction that contains history information related to the executed printing, using information related to the transaction. This makes it possible to manage that electronic data for which a usage permission is managed on the blockchain has been printed in the image forming apparatus.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-015635, filed Feb. 3, 2023 which is hereby incorporated by reference herein in its entirety.

What is claimed is:

1. An image forming apparatus comprising:

at least one memory device that stores a set of instructions; and at least one processor that executes the set of instructions to:

obtain a job ticket related to printing from an information terminal, regarding electronic data for which an ownership is managed in a transaction of a blockchain network;

obtain the electronic data from a management server that manages the electronic data, using information that is included in the obtained job ticket and is related to a transaction for transferring or lending the ownership of the electronic data from the information terminal to the image forming apparatus;

execute printing using the obtained electronic data and information related to print settings of the job ticket;

generate, using the information related to the transaction, a transaction that contains history information related to the executed printing; and return, based on execution of the printing, the ownership of the electronic data from the image forming apparatus to the information terminal, wherein the at least one processor further executes instructions stored in the at least one memory device to cause a display unit to display a code image that includes authentication information of the image forming apparatus; and receive a job ticket that has been issued by making print settings on the information terminal which has read the code image displayed on the display unit, wherein the job ticket includes, in addition to the print settings, URI information indicating an obtainment source of the electronic data and a transaction ID obtained from the blockchain network by the information terminal issuing to the blockchain network the transaction for transferring or lending the ownership of the electronic data, and wherein in the transaction for transferring or lending the ownership of the electronic data, an expiration date for transferring or lending the ownership of the electronic data is set.

2. The image forming apparatus according to claim 1, wherein the code image is a two-dimensional code, and the code image includes as authentication information at least a wallet address of the image forming apparatus and a public key and URI information for executing printing using the image forming apparatus.

3. The image forming apparatus according to claim 1, wherein when the code image is read by the information terminal, a setting screen for performing print settings is displayed on a display unit of the information terminal.

4. The image forming apparatus according to claim 1, wherein the at least one processor executes instructions in the memory device to:

obtain an authentication token from the blockchain network via the management server;

obtain the electronic data from the management server, according to the URI information indicating the obtainment source of the electronic data and included in the job ticket and using the obtained authentication token.

5. The image forming apparatus according to claim 1, wherein the transaction that contains history information related to the executed printing includes information indicating a return of the ownership of the electronic data.

6. A method of controlling an image forming apparatus, the method comprising:

causing a display unit to display a code image that includes authentication information of the image forming apparatus;

receiving a job ticket that has been issued by making print settings on an information terminal which has read the code image displayed on the display unit;

obtaining the job ticket related to printing from the information terminal, regarding electronic data for which an ownership is managed in a transaction of a blockchain network;

obtaining the electronic data from a management server that manages the electronic data, using information that is included in the obtained job ticket and is related to a transaction for transferring or lending the ownership of the electronic data from the information terminal to the image forming apparatus;

executing printing, using the obtained electronic data and information related to print settings of the job ticket;

generating a transaction that contains history information related to the executed printing, using the information related to the transaction; and returning, based on execution of the printing, the ownership of the electronic data from the image forming apparatus to the information terminal, wherein the job ticket includes, in addition to the print settings, URI information indicating an obtainment source of the electronic data and a transaction ID obtained from the blockchain network by the information terminal issuing to the blockchain network the transaction for transferring or lending the ownership of the electronic data, and in the transaction for transferring or lending the ownership of the electronic data, an expiration date for transferring or lending the ownership of the electronic data is set.

7. A non-transitory computer-readable storage medium storing a program for causing a computer to execute each step in a method of controlling an image forming apparatus, the method comprising:

causing a display unit to display a code image that includes authentication information of the image forming apparatus;

receiving a job ticket that has been issued by making print settings on an information terminal which has read the code image displayed on the display unit;

obtaining the job ticket related to printing from the information terminal, regarding electronic data for which an ownership is managed in a transaction of a blockchain network;

obtaining the electronic data from a management server that manages the electronic data, using information that is included in the obtained job ticket and is related to a transaction for transferring or lending the ownership of the electronic data from the information terminal to the image forming apparatus;

executing printing, using the obtained electronic data and information related to print settings of the job ticket;

generating a transaction that contains history information related to the executed printing, using the information related to the transaction; and returning, based on execution of the printing, the ownership of the electronic data from the image forming apparatus to the information terminal, wherein the job ticket includes, in addition to the print settings, URI information indicating an obtainment source of the electronic data and a transaction ID obtained from the blockchain network by the information terminal issuing to the blockchain network the transaction for transferring or lending the ownership of the electronic data, and in the transaction for transferring or lending the ownership of the electronic data, an expiration date for transferring or lending the ownership of the electronic data is set.

8. An image forming system that includes an information terminal, an image forming apparatus, and a management server, the information terminal comprising:

at least one first memory device that stores a set of instructions; and at least one first processor that executes the set of instructions to:

issue a transaction for transferring or lending the ownership to an image forming apparatus, regarding electronic data for which an ownership is managed in a transaction of a blockchain network; and generate a job ticket related to printing of the electronic data and transmit the job ticket to the image forming apparatus based on authentication information obtained from the image forming apparatus, the image forming apparatus comprising:

at least one second memory device that stores a set of instructions; and at least one second processor that executes the set of instructions to:

cause a display unit to display a code image that includes authentication information of the image forming apparatus;

receive the job ticket that has been issued by making print settings on the information terminal which has read the code image displayed on the display unit;

obtain the job ticket related to printing the electronic data from the information terminal;

obtain the electronic data from a management server that manages the electronic data, using information that is included in the obtained job ticket and is related to a transaction for transferring or lending the ownership of the electronic data from the information terminal to the image forming apparatus;

execute printing, using the obtained electronic data and information related to print settings of the job ticket;

generate a transaction that contains history information related to the executed printing, using the information related to the transaction; and return, based on execution of the printing, the ownership of the electronic data from the image forming apparatus to the information terminal, wherein the job ticket includes, in addition to the print settings, URI information indicating an obtainment source of the electronic data and a transaction ID obtained from the blockchain network by the information terminal issuing to the blockchain network the transaction for transferring or lending the ownership of the electronic data, and in the transaction for transferring or lending the ownership of the electronic data, an expiration date for transferring or lending the ownership of the electronic data is set.

* * * * *